(12) United States Patent
Krishnaswamy et al.

(10) Patent No.: US 8,862,178 B2
(45) Date of Patent: Oct. 14, 2014

(54) METHODS AND SYSTEMS FOR MANAGING PARTICIPATION IN MULTIPLE WIRELESS NETWORKS

(75) Inventors: Dilip Krishnaswamy, San Diego, CA (US); Hoang V. Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/033,458

(22) Filed: Feb. 23, 2011

(65) Prior Publication Data

US 2011/0269456 A1     Nov. 3, 2011

Related U.S. Application Data

(60) Provisional application No. 61/307,689, filed on Feb. 24, 2010.

(51) Int. Cl.
| | |
|---|---|
| *H04M 1/00* | (2006.01) |
| *H04W 8/26* | (2009.01) |
| *H04W 88/06* | (2009.01) |
| *H04L 29/06* | (2006.01) |
| *H04L 29/12* | (2006.01) |
| *H04W 12/08* | (2009.01) |

(52) U.S. Cl.
CPC ............... *H04W 8/26* (2013.01); *H04W 88/06* (2013.01); *H04L 63/105* (2013.01); *H04L 61/6077* (2013.01); *H04W 12/08* (2013.01)
USPC ............ 455/552.1; 455/426.1; 455/443; 455/464; 455/558; 370/255; 370/455; 370/334

(58) Field of Classification Search
CPC ............. H04M 7/1295; H04M 1/247; H04M 3/42246; H04M 7/0006; H04W 52/50; H04W 76/25–76/26; H04W 88/06
See application file for complete search history.

(56) References Cited

U.S. PATENT DOCUMENTS

| 6,980,602 B1 * | 12/2005 | Kleinerman et al. ......... 375/262 |
| 2004/0209651 A1 | 10/2004 | Tsukamoto |

(Continued)

FOREIGN PATENT DOCUMENTS

| EP | 1051052 A1 | 11/2000 |
| EP | 1320011 A2 | 6/2003 |

(Continued)

OTHER PUBLICATIONS

International Search Report and Written Opinion—PCT/US2011/026134, International Search Authority—European Patent Office—Sep. 22, 2011.

(Continued)

*Primary Examiner* — Rafael Pérez-Gutiérrez
*Assistant Examiner* — Keith Fang
(74) *Attorney, Agent, or Firm* — Charles E. Eggers

(57) ABSTRACT

Systems and methods of managing concurrent access using different network identities using a shared baseband hardware implementation are described. A wireless apparatus comprises a computing device, a baseband device, the baseband device including at least a modem processor, and computer readable storage medium that stores one or more instructions. The instructions, when executed by the computing device, are configured to associate a first identity of the wireless apparatus with a first wireless network, associate a second identity of the wireless apparatus with a second wireless network, enable the first identity to communicate over the first wireless network using the baseband device, and enable the second identity to communicate over the second wireless network using the baseband device. Data obtained by concurrently utilizing the baseband device utilizing different network identities and different networks can be aggregated on the wireless apparatus.

56 Claims, 9 Drawing Sheets

(56) References Cited

U.S. PATENT DOCUMENTS

| | | |
|---|---|---|
| 2006/0063565 A1 | 3/2006 | Ueno |
| 2006/0215601 A1* | 9/2006 | Vleugels et al. .............. 370/328 |
| 2007/0162619 A1 | 7/2007 | Aloni et al. |
| 2007/0180447 A1* | 8/2007 | Mazzaferri et al. ................ 718/1 |
| 2007/0294421 A1 | 12/2007 | Octaviano et al. |
| 2008/0162947 A1* | 7/2008 | Holtzman et al. ............ 713/193 |
| 2008/0306954 A1* | 12/2008 | Hornqvist .......................... 707/9 |
| 2009/0029736 A1* | 1/2009 | Kim et al. ..................... 455/558 |
| 2009/0239503 A1* | 9/2009 | Smeets .......................... 455/411 |
| 2009/0312020 A1 | 12/2009 | Lee |
| 2010/0188990 A1* | 7/2010 | Raleigh ........................ 370/252 |
| 2010/0304782 A1* | 12/2010 | Chang et al. ................ 455/552.1 |

FOREIGN PATENT DOCUMENTS

| | | |
|---|---|---|
| FR | 2814029 A1 | 3/2002 |
| JP | 2004336719 A | 11/2004 |
| JP | 2008005481 A | 1/2008 |
| JP | 2008538167 A | 10/2008 |
| KR | 20080092908 A | 10/2008 |
| KR | 20090130981 A | 12/2009 |
| WO | WO9853629 A1 | 11/1998 |
| WO | WO-2004102930 A1 | 11/2004 |
| WO | WO2006099588 A2 | 9/2006 |
| WO | WO2008156965 A1 | 12/2008 |

OTHER PUBLICATIONS

Ise M et al: "System-on-a-chip architecture for W-CDMA baseband modem LSI" Internet Article,, Oct. 23, 2001, pp. 364-369, XP010576786, ISBN: 978-0-7803-6677-0.

Josh Matthews: "Virtualization and Componentization in Embedded Systems",open kernel labs Oct. 31, 2008,XP000002658534, Retrieved from the Internet: URL:http://www.ok-1abs.com/assets/image_library/OK_Virtualization_Comp_WP.pdf [retrieved on Sep. 5, 2011].

* cited by examiner

METHODS AND SYSTEMS FOR MANAGING PARTICIPATION IN MULTIPLE WIRELESS NETWORKS

RELATED APPLICATIONS

The present application claims the benefit of U.S. Provisional Patent Application Ser. No. 61/301,689 filed on Feb. 24, 2010, titled METHODS AND SYSTEMS FOR MANAGING PARTICIPATION IN MULTIPLE WIRELESS NETWORKS each of which is hereby expressly incorporated by reference embodiments relate generally to systems and methods for managing networks, and more specifically to systems and methods for managing participation in wireless networks.

BACKGROUND

1. Field

The present disclosed embodiments relate generally to systems and methods for managing networks, and more specifically to systems and methods for managing participation in wireless networks.

2. Background

A mobile wireless device may need to participate as multiple identities over multiple wireless networks using a single radio. By way of example, the wireless device may be a client node, an access point or a relay with respect to one network (a first identity), and a client node, an access point or a relay with respect to another network (a second identity). However, conventional techniques fail to provide an adequate way for information to be exchanged between a given set/pair of identities within a wireless device. In particular, conventional techniques fail to provide the ability for concurrent access using different identities and fail to provide adequate protection with respect to information exchanges between identities. These failures have inhibited the ability to configure such mobile wireless devices with multiple identities.

There is therefore a need in the art for methods and systems that provide the ability for concurrent access using different identities and to provide sharing or aggregation or protection of information exchanged between identities in a wireless mobile device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects disclosed herein address the above stated needs by enabling multiple identities of a device, such as a wireless mobile device, to share resources, such as data. Thus, methods and systems are described herein for managing a device with multiple identities, including managing the flow of information between identities, and for coordinating participation between networks.

An aspect includes a wireless apparatus comprising a computing device and a non-transitory computer readable storage medium that stores one or more instructions, that when executed by the computing device, are configured to receive a request from a first identity of the wireless apparatus for a resource of a second identity of the wireless apparatus, determine, using one or more parameters, whether the request is to be fulfilled, and if the request is to be fulfilled, enable the first identity to access the requested resource of the second identity.

Certain aspects provide methods and systems for supporting substantially simultaneous existence of a wireless communication node of multiple identities using a hardware platform, and optionally, a single hardware platform (e.g., a single physical radio). Certain aspects utilize a shared hardware baseband implementation with the ability to concurrently utilize multiple network identities with multiple SIMs (e.g., USIM cards), and multiple transceivers on the platform. Certain aspects utilize a module, such as a virtualization-aware MAC (media access control) module, to support the substantially simultaneous existence of a wireless communication node with two or more different identities (e.g., as an access point or a relay or a client on one network using a first identity, and as an access point, or relay, or a client on the same network and/or on a different network using another identity) using a hardware platform (e.g., a shared single physical radio).

In an example aspect, the module limits a requesting identity's ability to access or perform certain operations with respect to an object or target associated with another identity (also referred to as a subject identity) and/or limits the ability of a subject identity that is the subject of an access request to provide access to such objects to the requesting identity. By way of example, a request may be for access or use of an object, such as a file (e.g., a data file, an audio and/or image/video content file, a text file, etc.), a directory, a port, shared memory segment, sensors, etc. By way of further example, the request may be for access to a thread or a process. This aspect enables concurrent aggregation of data accessed over different networks using different network identities, by way of example. Concurrent aggregation can be used to improve the peak bandwidth delivered to the platform. Data can be combined on the downlink paths from networks across the different network identities, or split on the uplink paths to the networks across the different identities.

A given object and/or identity may have a corresponding set of security attributes. When an identity attempts to access an object, the module examines the corresponding security attributes, applies corresponding authorization or filter rule(s), and determines whether the access or other operation is to be permitted.

An example aspect includes a wireless apparatus comprising a computing device, a baseband device, the baseband device including a modem processor and an accelerator, and a non-transitory computer readable storage medium that stores one or more instructions, that when executed by the computing device are configured to associate a first identity of the wireless apparatus with a first wireless network, associate a second identity of the wireless apparatus with a second wireless network, enable the first identity to communicate over the first wireless network using the baseband device, enable the second identity to communicate over the second wireless network using the baseband device.

An example aspect provides a method of managing network participation using a wireless communication device, the method comprising associating a first identity of the wireless communication device with a first wireless network, associating a second identity of the wireless communication device with a second wireless network, enabling the first identity to communicate over the first wireless network using a first baseband device, the first baseband device including a modem processor, and enabling the second identity to communicate over the second wireless network using the first baseband device.

An aspect includes a wireless apparatus comprising a computing device and a non-transitory computer readable storage medium that stores one or more instructions, that when executed by the computing device, are configured to associate a first identity of the wireless apparatus with at least one wireless network, associate a second identity of the wireless apparatus with at least one wireless network, receive a request from the first identity of the wireless apparatus for a resource of the second identity of the wireless apparatus, determine, using one or more parameters, whether the request from the first identity for the resource of the second identity is to be fulfilled, if the request is to be fulfilled, enable the first identity to access the requested resource of the second identity, and if the request is not to be fulfilled, deny the first identity access to the requested resource of the second identity.

In an example aspect, the first identity is associated with a first wireless network and the second identity is associated with a second wireless network different than the first wireless network. The first wireless network may utilize a different protocol than the second wireless network, or the first wireless network may utilize the same protocol as the second wireless network. In an example aspect, the first identity is optionally associated with a first Subscriber Identity Module or Universal Subscriber Identification Module (SIM/USIM) and the second identity is optionally associated with a second Subscriber Identity Module or University Subscriber Identity Module (SIM/USIM). In an example aspect, the first SIM/USIM is supported on the platform using a first physical, removable, SIMcard, a first UICC (Universal Integrated Circuit Card), or a first VSIM (Virtual SIM), and the second SIM is supported on the platform using a second physical, removable, SIMcard, a second UICC, or a second VSIM, where a Virtual SIM (VSIM) is a stored-memory software representation of a physical SIM/UICC card. In some aspects, the network operator may enable multiple identity support with a single SIM/UICC/VSIM. In such a multiple-identity-capable SIM, only one physical removable SIM-card or software VSIM is sufficient to concurrently support the multiple identities. In the current state of the art, a SIM/UICC/VSIM is associated with only a single network identity. In an example aspect the wireless apparatus includes a single operating system.

In an example aspect, the instructions are further configured to establish a multi-identity radio interface layer configured to interface between a telephony layer and a communication subsystem including a modem. In an example aspect, the first identity and the second identity utilize the same modem. In an example aspect, the first identity and the second identity utilize different transceivers. In an example aspect, the first identity and the second identity utilize the same transceiver.

In an example aspect, the first identity is an access point or relay identity and the second identity is a client identity. In an example aspect, the first identity is a first client identity and the second identity is a second client identity. In an example aspect, the first identity is a coordinator identity and the second identity is a client identity. In an example aspect, the first identity is a associated with a first user and the second identity is associated with a second user, wherein the first user has rights to access resources of a first type associated with the second user, and the second user does not have rights to access the resources of the first type associated with the first user.

In an example aspect, the wireless apparatus further comprises a hypervisor that provides separation between a protocol stack of the first identity and a protocol stack of the second identity. In an example aspect, the hypervisor sits above an operating system. In an example embodiment, the hypervisor communicates directly with a communication processing subsystem without an intervening operating system.

In an example aspect, the wireless apparatus further comprises a filter configured to filter, using at least a portion of the one or more parameters, requests from the first identity directed to at least resources of the second identity.

In an example aspect, the wireless apparatus further comprises a media access control (MAC) module configured to manage the wireless apparatus's participation in multiple networks, wherein the MAC module transmits and receives messages over a wireless communication interface.

In an example aspect, the first identity is associated with a first partition the second identity is associated with a second partition. In an example aspect, the first identity is associated with a first partition the second identity is associated with a second partition, wherein the first and second partitions are established on a modem subsystem level.

In an example aspect, the resource is data. In an example aspect, the resource is data received over a first wireless network by the second identity, and wherein the first identity is configured to transmit the data over a second wireless network. In an example aspect, the resource is sensor data. In an example aspect, the resource is spectrum usage data. In an example aspect, the resource is at least one of: substantially live video data, substantially live audio data, radio frequency data, user health-related data, photographs, and/or contact data.

In an example aspect, the one or more parameters include one or more of: requester identity, data-type requested, location of the wireless apparatus, time request is made or received, mobility of the wireless apparatus, link condition of the wireless apparatus, load, battery condition of the wireless apparatus.

In an example aspect, the wireless apparatus is configured to store at least a portion of the data associated with the second identity in a protected memory space not shared with the first identity. In an example aspect, the wireless apparatus is a cellular phone.

An example aspect includes a method of managing resource requests in a wireless communication device, the method comprising: associating a first identity of the wireless apparatus with at least one wireless network; associating a second identity of the wireless apparatus with at least one wireless network; receiving a request from the first identity of the wireless apparatus for a resource of the second identity of the wireless apparatus; determining, using one or more parameters, whether the request from the first identity for the resource of the second identity is to be fulfilled; if the request is to be fulfilled, enabling the first identity to access the requested resource of the second identity; and if the request is not to be fulfilled, denying the first identity access to the requested resource of the second identity.

An example aspect includes a non-transitory computer readable storage medium that stores one or more instructions, that when executed by a computing device, are configured to associate a first identity of the wireless apparatus with at least one wireless network, associate a second identity of the wireless apparatus with at least one wireless network, receive a request from the first identity of the wireless apparatus for a resource of the second identity of the wireless apparatus, determine, using one or more parameters, whether the request from the first identity for the resource of the second identity is to be fulfilled, if the request is to be fulfilled, enable the first identity to access the requested resource of the second identity, and if the request is not to be fulfilled, deny the first identity access to the requested resource of the second identity.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION

Figure 1:
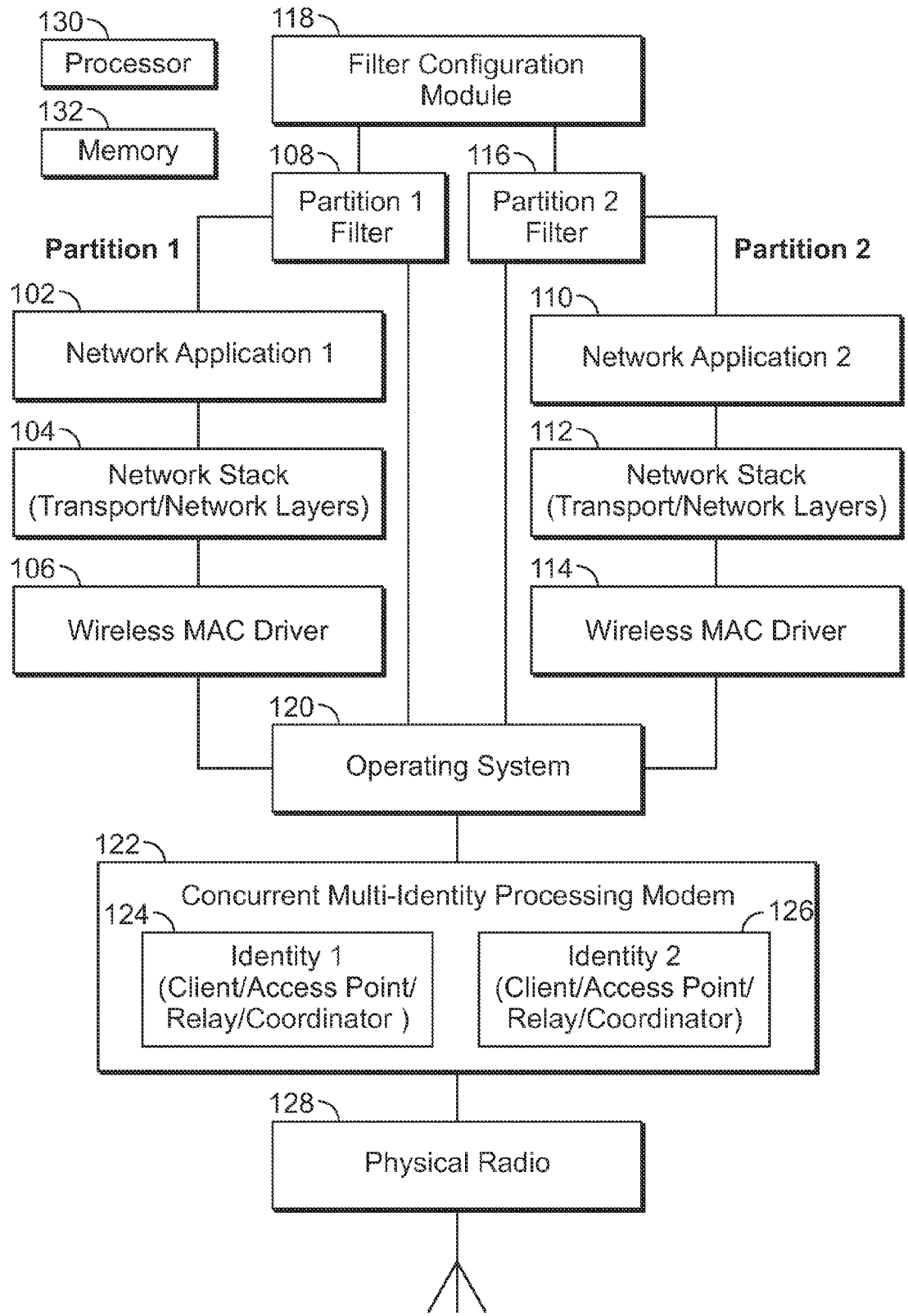
FIG. 1 is a first example embodiment of an architecture that provides protection for information exchanged between identities on a device.

Described herein are methods and systems for managing a device with multiple identities, including managing the flow of information between identities. For example, a wireless communication device may have a first network role associated with a first identity (e.g., client, access point, coordinator, or relay roles), and a second network role associated with a second identity (e.g., client, access point, coordinator, or relay roles). In certain example embodiments, two or more identities may share certain resources, such as a baseband device and/or data.

As will be described in greater detail herein, in certain example embodiments, a wireless/mobile computing and communications platform may include an applications processing subsystem and a communications processing subsystem. By way of example, the applications processing subsystem can comprise one or more processors (e.g., one or more high performance application processors such as ARM or x86 based cores, or other processors). By way of further example, the communications processing subsystem can optionally include one or more DSP modem processors, optionally along with a lower performance control processor, memory (e.g., local and/or external RAM/non-volatile (e.g., Flash) memory, baseband processing modules (e.g., encoders, decoders, interleavers, deinterleavers, modulators, demodulators etc.), optionally with specialized acceleration blocks that perform algorithms, such as Turbo/Viterbi/LDPC decoding, audio codes, etc.

In certain embodiments, the communication processing subsystem supports multiple identities using common hardware for a given protocol. For example, the communication processing subsystem may support different identities, to operate on different networks.

By way of example, different WWAN identities can be supported using multiple hardware SIMs/UICC cards for WWAN access of one or more WWAN networks. In addition or instead, a virtual SIM is used for one or more of the WWAN networks. Optionally, the SIMs/UICCs slots are directly accessible by the communications processing subsystem. Optionally, in addition or instead, the memory associated with the VSIMs is accessible by the communications processing subsystem. The VSIM may be implemented using a software version of a SIM card, which obviates the need for a physical SIM/UICC card being present in the SIM/UICC card slot.

The modem system can access different networks using different transceivers, using the different identities established over different networks with the different SIMs (e.g., SIMs, UICCs, and/or VSIMs). Tasks in the communication processing subsystem can be time-sliced across the networks or performed in an interleaved manner with identity awareness, so that the output/input of the processing tasks can be associated with the appropriate transceiver interface. This enables concurrent multi-identity processing in the communication processing subsystem.

Such concurrent multi-identity access can be utilized to participate concurrently in different networks, to concurrently aggregate data accessed over different networks, and/or for filtered processing of information between networks. In comparison, conventional modem subsystems atomically process tasks without differential identity awareness, and use a single transceiver to communicate data.

The present devices, apparatus, methods, computer-readable media and processors now will be described more fully hereinafter with reference to the accompanying drawings, in which aspects of various embodiments are shown. The devices, apparatus, methods, computer-readable media and processors, however, may be embodied in many different forms and should not be construed as limited to the aspects set forth herein.

Various embodiments are described herein in connection with a mobile device. A wireless device can also be called a system, subscriber unit, subscriber station, mobile device, mobile station, mobile, remote station, remote terminal, access terminal, user terminal, terminal, wireless communication device, user agent, user device, or user equipment (UE). A wireless device can be a cellular telephone, a cordless telephone, a Session Initiation Protocol (SIP) phone, a wireless local loop (WLL) station, a personal digital assistant (PDA), a handheld device having wireless connection capability, a computing device, an entertainment device (e.g., a television) or other audio/visual (AV) device having wireless connection capability, or other processing device connected to a wireless modem.

The word "exemplary" is used herein to mean "serving as an example, instance, or illustration." Any embodiment described herein as "exemplary" is not necessarily to be construed as preferred or advantageous over other embodiments.

While certain examples describe the use of multiple filters, the filters may actually be co joined or the filter function may be performed by fewer filters (e.g., a single filter module). Similarly, while certain example embodiments may illustrate a single filter, optionally, multiple filters may be used.

A wireless device may be mobile or stationary, and may communicate with one or more base stations. A wireless device may transmit and receive data packets.

As will be described in greater detail below, certain embodiments provide virtual co-existence of multiple identities. By way of illustration an identity may be a functional module and/or partition within the wireless device associated with a distinct wireless network identifier in a given wireless network. By way of example, the identities may include one or more access points, one or more clients, one or more coordinators, and/or one or more relays on the same wireless node (e.g., where a communication node acts as a client, a coordinator, or a relay in one or more networks and as an access point in one or more other networks). Thus, different identities may be associated with different networks or have different functions with respect to the same network or with respect to different networks.

The wireless device may optionally be configured to communicate with other peers via a peer-to-peer communications (e.g., using Bluetooth or other protocol). Certain information may be selectively shared between identities, certain information may be completely shared (e.g., when utilizing different network connections to combine information from networks), and certain information may never be shared between identities.

While certain examples will be discussed with respect to a wireless device having two identities that can access two different network at substantially the same time, optionally, the wireless device may have more than two identities (or only a single identity at a given point in time) and may be able to access more than two networks at substantially the same time. For example, the wireless device may be configured to have multiple client identities with respect to one or more networks and/or multiple access point identities with respect to one or more networks. Optionally, multiple identities may utilize the same communication channel, with each identity using the same radio of the wireless device (e.g., concurrently, via a time slice, interleaved processing, in a round robin arrangement, or otherwise), but with different identities performing different operations. For example, this can enable a user to appear as different persons on a network using the same wireless device.

By way of further example, a node may have multiple Subscriber Identity Modules (SIMs) (e.g., standard SIMs, Universal SIMs (USIMs) with UICC cards, virtual SIMs (VSIMS) or any combination thereof), and a given identity may be associated with a respective SIM. Thus, optionally each SIM may have its own identity or subset of identities. Similarly, a node may have multiple software-negotiated dynamic credentials, such as for WLAN networks, personal area networks, ZigBee networks, etc., wherein different credentials may be associated with different identities. By way of further illustration, a wireless node may have two subscriptions based on two SIMs, thereby enabling the wireless node to act as a client on two networks. For example, a first SIM may be used to enable the wireless node to be an LTE (Long Term Evolution) client, and the second SIM may be used to enable the wireless node to be a HSPA (High Speed Packet Access) client.

A wireless device (e.g., a mobile wireless device, such as a cell phone or a MediaFlo® television) may need to participate as multiple identities over multiple wireless networks using one or more hardware resources, and optionally, using a single hardware interface (e.g., a single radio). As similarly discussed above, the wireless device may be an access point with respect to a first network (a first identity), and a client node with respect to another network (a second identity). In certain embodiments, the mobile wireless device may need to provide protection for information exchanged between a given set/pair of identities. Certain embodiments described herein provide or enable such protection.

For example, a wireless phone (or other wireless device) may behave as a coordinator in a first sensor network (such as a ZigBee, Bluetooth, or WiFi/IEEE 802.11 coordinator in a corresponding network). By way of further example, a coordinator may be responsible for starting a network and/or for choosing network parameters. While acting as a coordinator in the first sensor network, the wireless phone (or other wireless device) may behave as a client node in a second sensor network with the same protocol as the first sensor network. With respect to the second sensor network, the phone (or other wireless device) may need to share some information obtained in the first network.

By way of illustration, a wireless node's two different identities may be reflected in two different sensor networks, such as client Node 17 in network 1 and client Node 12 in network 2. By way of yet further example, the wireless node may be client Node 17 in Network 1 and coordinator Node 0 in Network 2.

If the foregoing scenario, the sensor network may be used for one or more applications. For example, the sensor network may be used for, and include sensors for spectrum usage detection (e.g., for cognitive radio wireless communication where a wireless device and/or network modifies transmission or reception parameters to enhance communication and to avoid RF interference from other sources), traffic prediction and avoidance, weather prediction, radiation detection (e.g., for homeland security), medical monitoring (e.g., with sensors monitoring hearts, body temperatures, etc., of patients), network telemetry (e.g., measuring broadcast power, interference, etc.), security monitoring (e.g., where the sensors include still and/or video cameras and/or microphones), etc. By way of further illustration, with respect to spectrum usage measurements, the alteration of parameters may be based at least in part on the active monitoring of several factors in the external and internal radio environment, such as radio frequency spectrum, user behavior and network state.

In an example embodiment, a sensor network may have a number of general or special-purpose sensor devices that may be deployed in a given geographic region. One or more of the sensor devices may include a sensor to measure a particular physical phenomenon such as, e.g., radio frequency (RF) usage in a particular frequency band, temperature, motion, radiation, heart rate, etc. A sensor may comprise a detector, measurement circuitry, etc. A sensor device may also include communication and/or networking capability. By way of further example, the sensors may be in the form of video cameras in children's cell phone which enables parents to monitor the safety of their children. The sensor devices may make measurements with the sensors, collect measurement data, self-organize into a low-power multi-hop mesh network, and employ a communication protocol to forward the measurement data and other information (e.g., location and/or time information) to a designated server. The server may process and aggregate the data obtained from all or a portion of the sensor devices. The terms "data", "information", and "measurements" are often used interchangeably.

By way of further example, a mobile device, such as a wireless phone, may behave as both an access point (e.g., for the Internet or other network) and as a client. By way of illustration, the phone may behave as an access point (that allows wireless communication devices to connect to a wireless network using WiFi, Bluetooth or technology) in a first WLAN (wireless local area network) and, at substantially the same time, as a client in a second WLAN. The WLAN may facilitate providing a symmetrical media access control (MAC) channel for access points and access terminals, as well as backhaul support with in-band wireless capability. By way of further illustration, the wireless device may extend its broadband internet connectivity over an ad hoc WLAN network (e.g., a network that was not established in whole according to a planned deployment by a central entity). At the same time, the wireless device may be a client node in another network that provides the phone its broadband internet connectivity.

By way of illustration, a wireless node may obtain identities by subscribing to and/or participating as a client in two or more different WLANs using WLAN and AAA (Authentication, Authorization, and Accounting) authentication (e.g., using a respective Wi-Fi Protected Access (WPA2) master key combined with a respective AES (Advanced Encryption Standard) session key for each network). By way of further example, a wireless node may act as a client in a first network and an access point in second network, using a WPA2 master key combined with an AES session key for authentication as a client in the first network, and using a service set identifier (SSID) when acting as an access point in the second network.

By way of further illustration a wireless mobile device (e.g., a phone) can be accessing a sensor (e.g., to collect personal data or content such as GPS location information or video content). The device user may then transport the device within range of a coordinator network operated via a coordinator device. The wireless mobile device may then use the same channel or different channels to communicate with the sensor and/or the coordinator device.

Certain embodiments allow a user, original equipment manufacturer, and/or network operator/telephone company to specify which information may be shared between two or more identities. One or more of the following parameters may be used by certain embodiments in determining what information can be shared between identities:

requester identity (e.g., a user or other authorized entity may specify what information can be provided to certain types of requesters or specific requesters. For example, a user may specify that users on a user-specified list are to be provided with one or more types of specified content, such as photos, videos, music, etc.; or other types of information such as location/GPS information of the mobile device, the user's contact information, sensor information, email, SMS/MMS messages, sensor data (e.g., one or more of the following data: substantially live/real-time video, audio, photographic, health, etc.). Optionally digital certificates are used to verify identity;
  subject identity (the identity to which the requested object/process "belongs" to). Optionally digital certificates are used to verify identity;
  data type (e.g., photos, recorded videos, live videos and/or sound (e.g., being captures by a video camera/microphone on the wireless device), music, location/GPS information, contact information, sensor information, email, SMS/MMS messages, sensor readings, etc.);
  load (e.g., load on the access point identity, on a network, etc.), where, for example, if the load reaches a certain threshold, access to certain objects/processes may be denied;
  location (e.g., for certain physical locations of the wireless communications device, access to certain objects/processes is denied);
  time (e.g., at certain times, access to certain objects/processes is denied);
  mobility (e.g., if the device is moving at a certain rate (distance/time), access to certain objects/processes is denied);
  link condition (e.g., if the link quality/power is below a certain level, access to certain objects/processes is denied);
  energy/battery level (e.g., if the battery power is below a certain level, access to certain objects/processes is denied);
  communication channel (e.g., Bluetooth, ZigBee, WiFi, 3G cellular network, etc.) over which request came or over which the requested data is to be transmitted.

Thus, for example, at the application layer, inter-identity information filtering or rules-based software can accord different access privileges to different resources on the platform depending on the network identity.

The request and sharing scenarios discussed above may be managed using one or more of the embodiments discussed herein.

With reference to FIG. 1, this example embodiment of an architecture for a wireless communication device includes a multi-identity management module 122, which may be a concurrent multi-identity processing modem and/or a virtualized MAC layer module that is configured to coordinate participation between different partitions and/or networks (optionally including different networks with the same protocol or with different protocols), such as in the scenarios discussed above. The module 122 enables multiple identities to reside on the same hardware platform and safely share one or more objects (e.g., data) and/or resources (e.g., a single physical radio 128).

A mobile node, such as the wireless communication device illustrated in FIG. 1, may optionally exist continuously on two or more networks on the same wireless communication channel. Instead, the node may switch between wireless communication channels to participate in the different wireless networks.

A given identity is provided access to information produced by that identity (e.g., location information, sensor information, user generated content, user purchased content, other content, contact information, live video or audio information, etc.). In addition, software (e.g., the module 122) determines/identifies which information produced by a given identity can be shared with other identities. In the illustrated example, and as explained in greater detail below, information flow between the identities is managed via filters and through an operating system, optionally without use of a hypervisor. However, optionally, a given identity itself determines what information will be shared with another identity. Optionally, a filter can be dynamically enabled and disabled (e.g., via a signal received via the radio or via a user interface command received from a user via a device user interface). Optionally, the filter can enable concurrent data aggregation across networks.

In certain embodiments, different protocol stacks implementing different network protocols are optionally used for different identities of the wireless device. For example, a network protocol stack module may be used to implement the protocol architecture, or a portion thereof, for the wireless device. In certain example embodiments, the protocol stack module is responsible for implementing several protocol layers running on top of a data link layer implemented by a network interface. By way of example, the protocol stack module may be used to implement an upper portion of the data link layer by providing flow control, acknowledgement, and error recovery. The protocol stack module may also be used to implement the network layer by managing source to destination data packet transfer, as well as the transport layer by providing transparent transfer of data between users.

In the example illustrated in FIG. 1, there are two partitions (partition 1, partition 2) corresponding to two different identities (e.g., a client, an access point, a relay, or coordinator 124; and a client, an access point, a relay, or coordinator 126), although the device can include more than two identities. Optionally, the partitions need not be explicit.

Partition 1 includes a network application 102, which communicates with a lower level network stack layer 104, which communicates with a lower level MAC driver 108, which communicates with the device operating system 120. Partition 2 includes a network application 110, which communicates with a lower level network stack layer 112, which communicates with a lower level MAC driver 114, which communicates with the device operating system 120. A control device (e.g., a computing device, such as a processor) is used to execute the operating system and certain other processes, and memory is used to store certain data and modules described herein.

In this example embodiment, a given partition is associated with a filter. A given filter is coupled to a network application (the filter receives requests from the network application) in a corresponding partition. The filter filters requests from the network application in accordance with parameters/rules specified by a filter configuration module 118. For example, the filter may be configured to filter out (e.g., block or mark the requests as "not be fulfilled") requests from the application of one partition for access to an object/resource of a subject partition (e.g., to data of the other partition) that are considered unsafe or otherwise not permitted. Permitted requests are passed by the filter to the operating system 120 for servicing, which in turn provides access to data of the other partition in accordance with the request. As discussed above, the filter parameters or rules may include the requester identity, content/data-type, location, time requested, mobility, link condition, load, battery condition, and/or other parameters.

The parameters specified by the filter configuration monitor 118 may have been previously specified by an authorized entity, such as a device user, original equipment manufacturer, and/or network operator/telephone company. For example, a graphical user interface may be hosted/provided by the device and/or via another computing device via which a user can specify what types of data are to be shared with which requesters. Optionally, the filter parameters are dynamically defined (e.g., via a wireless communication channel).

Partition 1 is associated with a filter 108 which is coupled to network application 102. Partition 2 is associated with a filter 116 which is coupled to network application 110. The filters 108, 116 pass permitted requests to the operating system 120, which in turn provides the permitted requested data (e.g., as discussed below with respect to FIG. 5).

The operating system 120 may provide time division multiplexed access to requested data or resources (e.g., data of a given partition, or the radio 128, etc.).

The example embodiment includes a processor 128 and non-transitory memory 130 (e.g., RAM, Flash memory, or other solid-state, optical, or magnetic memory type). The memory 130 may store program instructions which may be executed by the processor 128 to execute applications and perform some or all of the computing functions of the wireless communication device.

Figure 2:
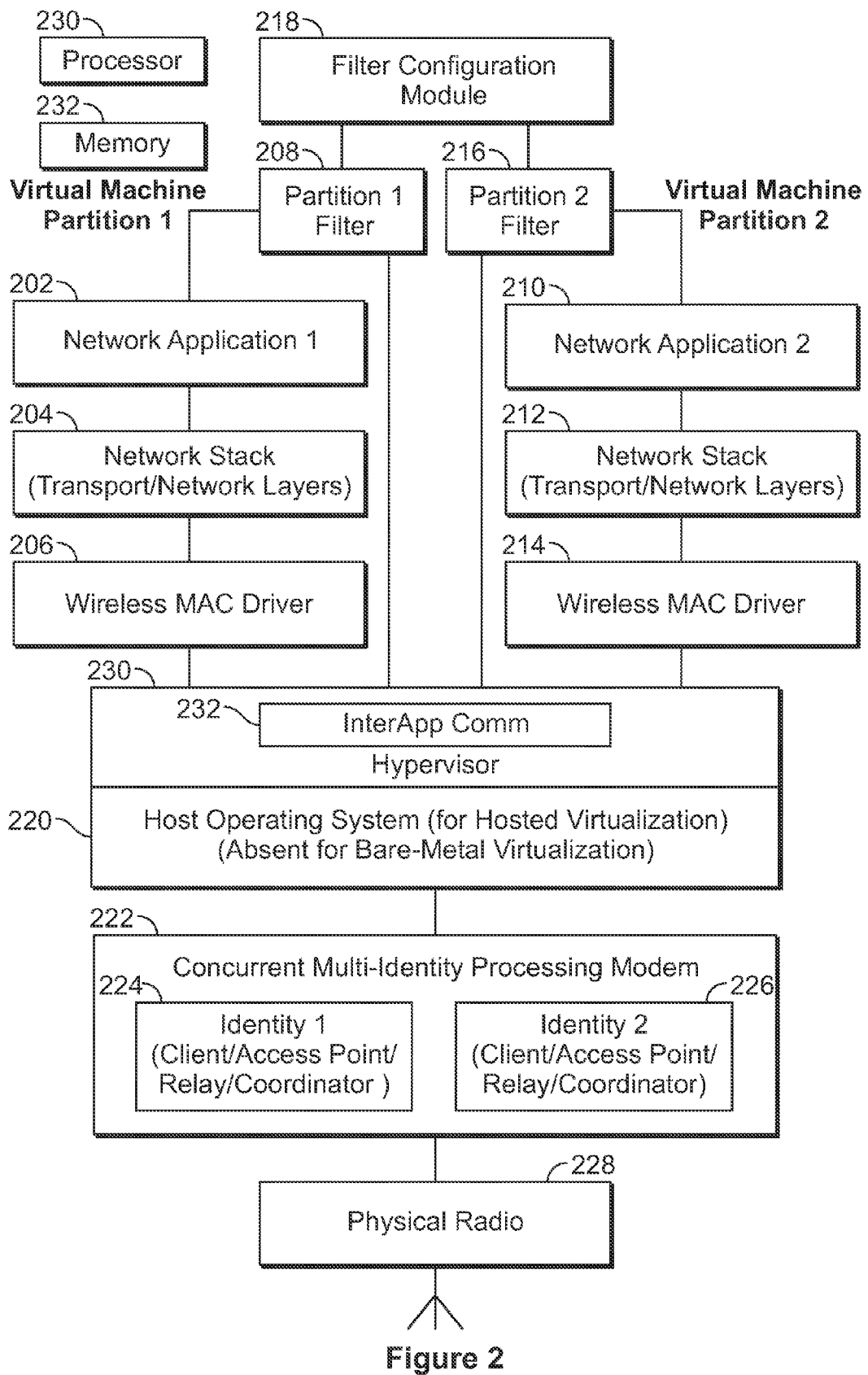
FIG. 2 is a second example embodiment of an architecture that provides protection for information exchanged between identities on a device.

FIG. 2 includes an embodiment that utilizes a hypervisor, which facilitates scaling up to larger number of partitions. The hypervisor may be used create separate partitions for access to different networks. With reference to FIG. 2, this example embodiment of an architecture for a wireless device includes a concurrent multi-identity processing modem 222 that is configured to co-ordinate participation between different networks (including different networks with the same protocol or with different protocols), such as in the scenarios discussed above. The modem 222 enables multiple identities to reside on the same hardware platform/baseband circuit and safely share one or more interfaces (e.g., a single physical radio 228 using multitasking).

As similarly discussed above with respect to FIG. 1, in certain embodiments, different protocol stacks implementing different network protocols are optionally used for different identities of the wireless device.

In the example illustrated in FIG. 2, there are two partitions (virtual machine partition 1, virtual machine partition 2) corresponding to two different identities (e.g., a client, an access point, a relay, or coordinator 224; and a client, an access point, a relay, or coordinator 226), although the device can include more than two identities.

Virtual machine partition 1 includes a network application 202, which communicates with a lower level network stack layer 204, which may include transport/network layers (e.g., layers 3 and/or 4 of the OSI (Open Systems Interconnection) reference model) and which communicates with a lower level MAC driver 208, which communicates with a hypervisor 230 (via inter-application communication interface 232 in this example), which communicates with the device host operating system 220 for hosted virtualization. Virtual machine partition 2 includes a network application 210, which communicates with a lower level network stack layer 212, which may include transport/network layers (e.g., layers 3 and/or 4 of the OSI reference model) and which communicates with a lower level MAC driver 214, which communicates with a hypervisor 230, which communicates with the device operating system 220. While this example illustrates the hypervisor 230 hosted by the operating system 230, optionally instead, the hypervisor 230 may be in a bare metal configuration, such that the hypervisor 230 runs directly on the baseband implementation (e.g., including some or all of the following: a modem DSP, accelerators, channel encoder/decoder, interleaver/deinterleaver, modulator, demodulator, integrated memory etc.), without the operating system layer between the hypervisor and the communication subsystem hardware.

In this example embodiment, the hypervisor 230 provides separation between the different protocol stacks for the application associated with each identity that is desired by the mobile device.

For example, the hypervisor 230 may optionally act as virtual machine manager that enables multiple identities to run on the mobile device concurrently. Optionally, each identity appears, to a given identity, to have the mobile device host's processor, memory, and other resources all to itself. However, in an example embodiment, optionally the hypervisor 230 is actually allocating the resources needed to each identity and ensuring that the identities do not unacceptably disrupt each other.

In this example embodiment, a given partition is associated with a filter. A given filter is coupled to an application in a partition. The filter filters requests from the application in accordance with parameters specified by a filter configuration module 218. The filter filters out requests from the application of one partition to the other partition (e.g., to data of the other partition) that are considered unsafe or otherwise not permitted. Permitted requests are passed by the filter to the hypervisor 230, which in turn, via the operating system 220, provides access to data of the other partition in accordance with the request. As discussed above, the filter parameters may include the requester identity, content/data-type, location, time requested, mobility, link condition, load, battery condition, and/or other parameters.

The parameters specified by the filter configuration monitor 218 may have been previously specified by an authorized entity, such as a device user, original equipment manufacturer, and/or network operator/telephone company. For example, a graphical user interface may be hosted/provided by the device (or accessed via another terminal, such as a personal computer) via which a user can specify what types of data is to be shared with which requesters.

Virtual machine partition 1 is associated with a filter 208 which is coupled to network application 202. Virtual machine partition 2 is associated with a filter 216 which is coupled to network application 210. The filters 208, 216 pass permitted requests to the operating system 220, which in turn provides the permitted requested data. The hypervisor 230 routes requests and/or data received by the filters 208, 216 via an inter-application communication module to the appropriate partition application in accordance with the access/sharing rules.

The example embodiment includes a processor 228 and non-transitory memory 230 (e.g., RAM, Flash memory, or other solid-state, optical, or magnetic memory type). The memory 230 may store program instructions which may be executed by the processor 228 to execute applications and perform some or all of the computing functions of the wireless communication device.

Figure 3:
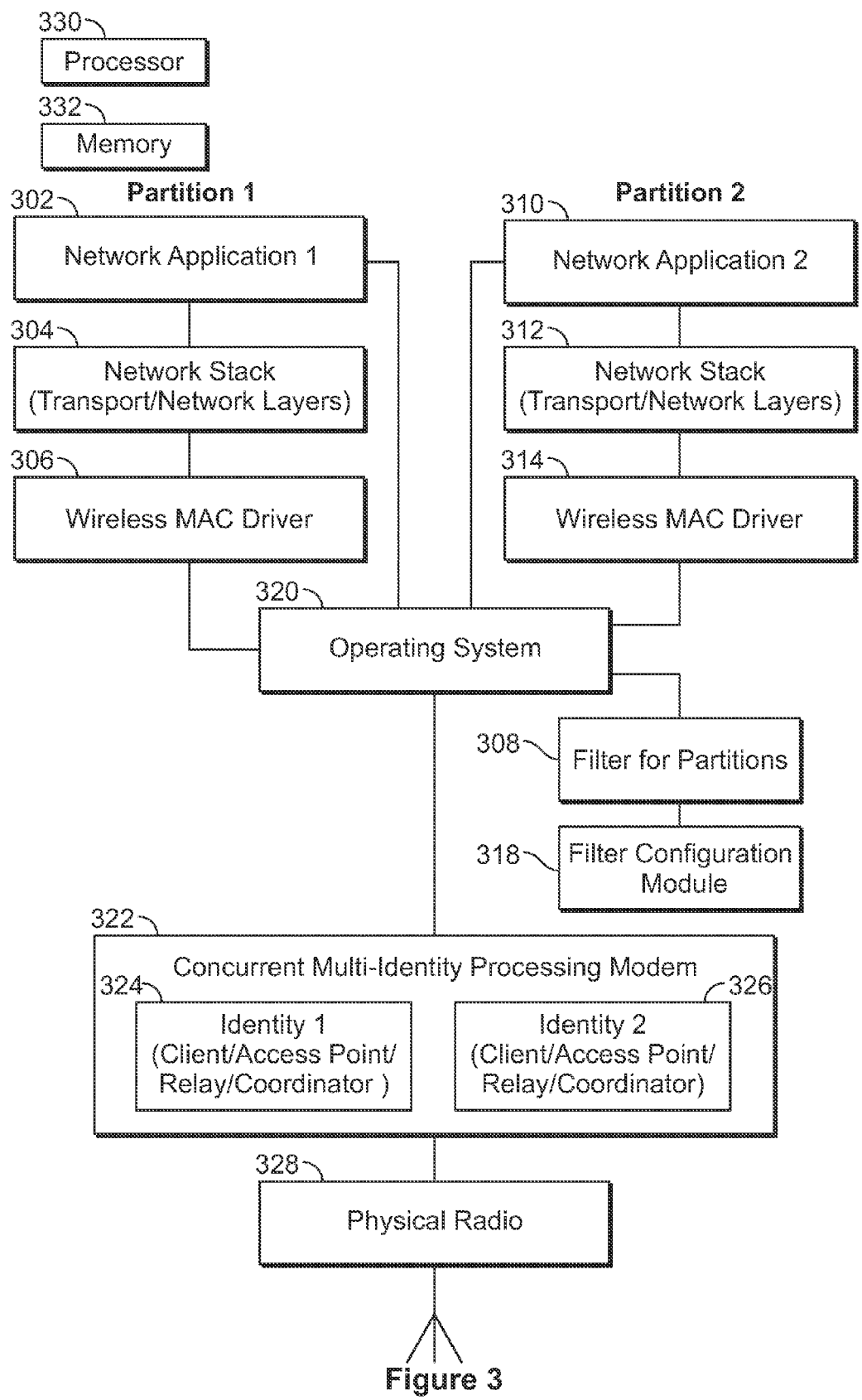
FIG. 3 is a third example embodiment of an architecture that provides protection for information exchanged between identities on a device.

FIG. 3 illustrates an example embodiment, wherein network application requests and data are routed to an operating system without first passing though corresponding request filters. In this embodiment, the operating system filters requests and/or data. With reference to FIG. 3, this example embodiment of an architecture for a wireless communication device includes a concurrent multi-identity processing modem 322 that is configured to coordinate participation between different networks (optionally including different networks with the same protocol or with different protocols), such as in the scenarios discussed above. The modem 322 enables multiple identities to reside on the same hardware platform and safely share one or more objects and/or resources (e.g., a baseband circuit or a single physical radio 328 using multitasking).

As similarly discussed above with respect to FIG. 1, in certain embodiments, different protocol stacks implementing different network protocols are optionally used for different identities of the wireless device.

As similarly discussed above, a given identity is provided access to information produced by that identity (e.g., location information, sensor information, user generated content, user purchased content, other content, contact information, live video or audio information, etc.). In addition, software (e.g., a virtualized MAC module) is provided that determines which information produced by a given identity can be shared with other identities. In the illustrated example, and as explained in greater detail below, information flows through an operating system, optionally without use of a hypervisor.

In this example, a network application requests from a given network application in one partition for data or resources of another network application of another partition are routed to the operating system 320. The operating system, utilizing a filter 308, filters requests and/or data. Optionally, the filter 308 can be dynamically enabled and disabled (e.g., via a signal received via the radio or via a user interface command received from a user via a device user interface). Optionally, the filtering can be a separate thread scheduled by the operating system 320. A given application may write data to a certain location (e.g., a protected memory space) not directly accessible to a requesting second application (e.g., in a different partition). The operating system 320 may filter and copy filtered information from the protected memory space of the subject location to another location for access to the requesting second application.

In the example illustrated in FIG. 3, there are two partitions (partition 1, partition 2) corresponding to two different identities (e.g., a client, an access point, a relay, or coordinator 324; and a client, an access point, a relay, or coordinator 326), although the device can include more than two identities. Optionally, the partitions need not be explicit.

Partition 1 includes a network application 302, which communicates with a lower level network stack layer 304, which communicates with a lower level MAC driver 306, which communicates with the device operating system 320. Partition 2 includes a network application 310, which communicates with a lower level network stack layer 312, which communicates with a lower level MAC driver 314, which communicates with the device operating system 320.

The operating system 320 utilizes the filter 308 to filter requests received by the operating system 320 from a given network application for resources or data of a network application of a different partition. The filter 308 may perform the filtering operations in accordance with parameters/rules specified by a filter configuration module 318. For example, the filter may be configured to filter out (e.g., block or mark the requests as "not be fulfilled") requests from the application of one partition for access to an object/resource of a subject partition (e.g., to data of the other partition) that are considered unsafe or otherwise not permitted. Permitted requests are passed by the operating system 320 to data of the other partition in accordance with the request. As discussed above, the filter parameters or rules may include the requester identity, content/data-type, location, time requested, mobility, link condition, load, battery condition, and/or other parameters.

The parameters specified by the filter configuration monitor 318 may have been previously specified by an authorized entity, such as a device user, original equipment manufacturer, and/or network operator/telephone company. For example, a graphical user interface may be hosted/provided by the device (or accessed via another terminal, such as a personal computer) via which a user can specify what types of data are to be shared with which requesters. Optionally, the filter parameters are dynamically defined (e.g., via a wireless communication channel).

The operating system 320 may provide time division multiplexed access to requested data or resources (e.g., data of a given partition, or the radio 128, etc.).

The example embodiment includes a processor 328 and non-transitory memory 330 (e.g., RAM, Flash memory, or other solid-state, optical, or magnetic memory type). The memory 330 may store program instructions which may be executed by the processor 328 to execute applications and perform some or all of the computing functions of the wireless communication device.

Figure 4:
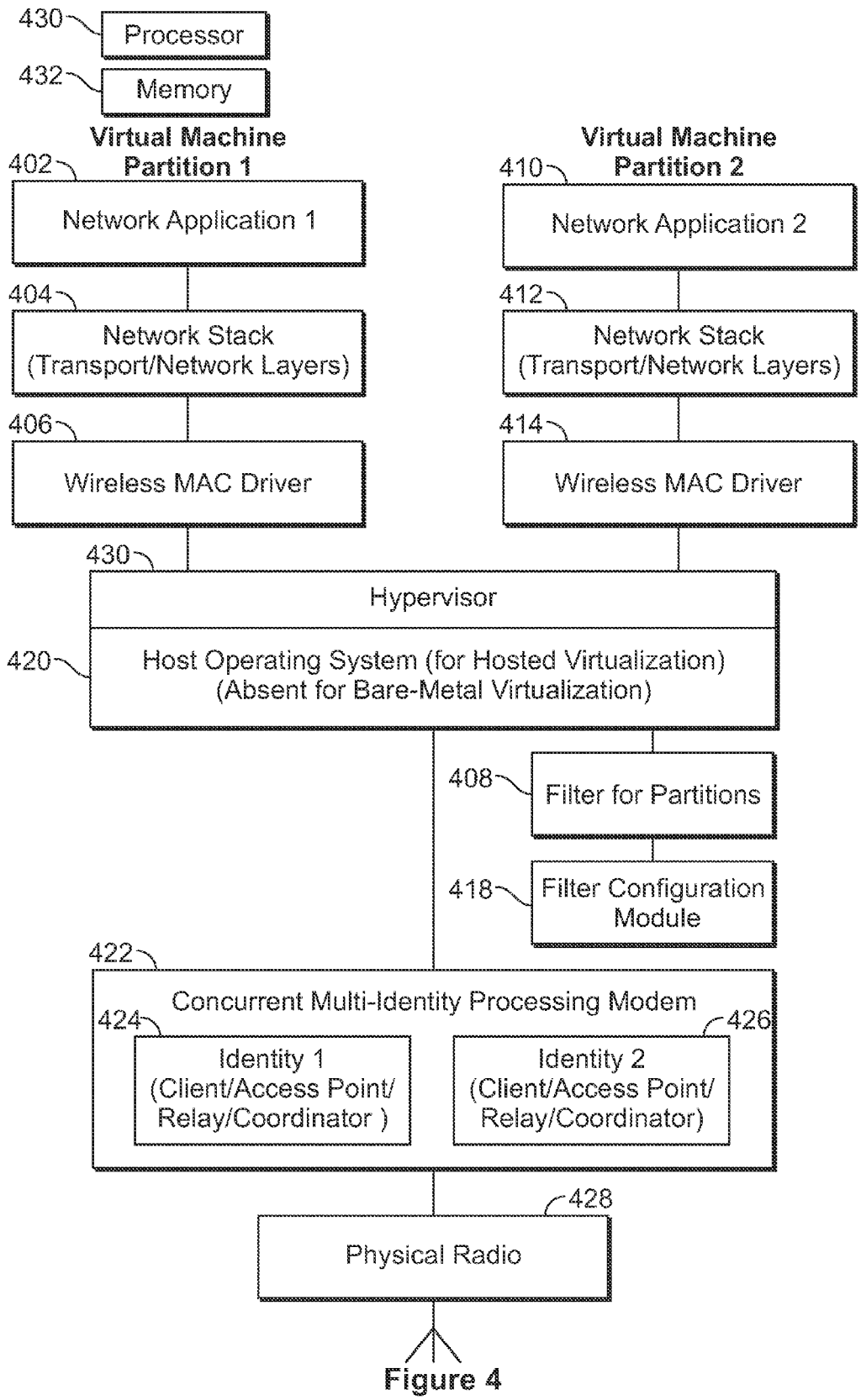
FIG. 4 is a fourth example embodiment of an architecture that provides protection for information exchanged between identities on a device.

The embodiment illustrated in FIG. 4 is similar to that of FIG. 3, except that a hypervisor 430 is utilized.

In this embodiment, the operating system 420 filters requests and/or data via a filter. With reference to FIG. 4, this example embodiment of an architecture for a wireless communication device includes a concurrent multi-identity processing modem 422 that is configured to coordinate participation between different networks (optionally including different networks with the same protocol or with different protocols), such as in the scenarios discussed above. The modem 422 enables multiple identities to reside on the same hardware platform and safely share one or more objects and/or resources (e.g., a single physical radio 428).

As similarly discussed above with respect to FIG. 1, in certain embodiments, different protocol stacks implementing different network protocols are optionally used for different identities of the wireless device.

As similarly discussed above, a given identity is provided access to information produced by that identity (e.g., location information, sensor information, user generated content, user purchased content, other content, contact information, live video or audio information, etc.). In addition, software (e.g., the virtualized MAC module 422) is provided that determines which information produced by a given identity can be shared with other identities. In the illustrated example, and as explained in greater detail below, information flows through an operating system, with the use of a hypervisor 430.

In this example, a network application requests from a given network application in one partition for data or resources of another network application of another partition are routed to the hypervisor 430, which in turn routes the requests to the operating system 420. The operating system, utilizing a filter 408, filters requests and/or data. Optionally, the filter 408 can be dynamically enabled and disabled (e.g., via a signal received via the radio or via a user interface command received from a user via a device user interface). Optionally, the filtering can be a separate thread scheduled by the operating system 420. A given application may write data to a certain location (e.g., a protected memory space) not directly accessible to a requesting second application (e.g., in a different partition). The operating system 420 may filter and copy filtered information from the protected memory space of the subject location to another location for access to the requesting second application In the example illustrated in FIG. 4, there are two partitions (partition 1, partition 2) corresponding to two different identities (e.g., a client, an access point, a relay, or coordinator 424; and a client, an access point, a relay, or coordinator 426), although the device can include more than two identities. Optionally, the partitions need not be explicit.

Partition 1 includes a network application 402, which communicates with a lower level network stack layer 404, which communicates with a lower level MAC driver 408, which communicates with the device operating system 420. Partition 2 includes a network application 410, which communicates with a lower level network stack layer 412, which communicates with a lower level MAC driver 414, which communicates with the device operating system 420.

The operating system 420 utilizes the filter 408 to filter requests received by the operating system 420 from a given network application for resources or data of a network application of a different partition. The filter 408 may perform the filtering operations in accordance with parameters/rules specified by a filter configuration module 418. For example, the filter may be configured to filter out (e.g., block or mark the requests as "not be fulfilled") requests from the application of one partition for access to an object/resource of a subject partition (e.g., to data of the other partition) that are considered unsafe or otherwise not permitted. Permitted requests are passed by the operating system 420 to data of the other partition in accordance with the request. As discussed above, the filter parameters or rules may include the requester identity, content/data-type, location, time requested, mobility, link condition, load, battery condition, and/or other parameters.

The parameters specified by the filter configuration monitor 418 may have been previously specified by an authorized entity, such as a device user, original equipment manufacturer, and/or network operator/telephone company. For example, a graphical user interface may be hosted/provided by the device (or accessed via another terminal, such as a personal computer) via which a user can specify what types of data are to be shared with which requesters. Optionally, the filter parameters are dynamically defined (e.g., via a wireless communication channel).

The example embodiment includes a processor 428 and non-transitory memory 430 (e.g., RAM, Flash memory, or other solid-state, optical, or magnetic memory type). The memory 430 may store program instructions which may be executed by the processor 428 to execute applications and perform some or all of the computing functions of the wireless communication device.

Figure 5:
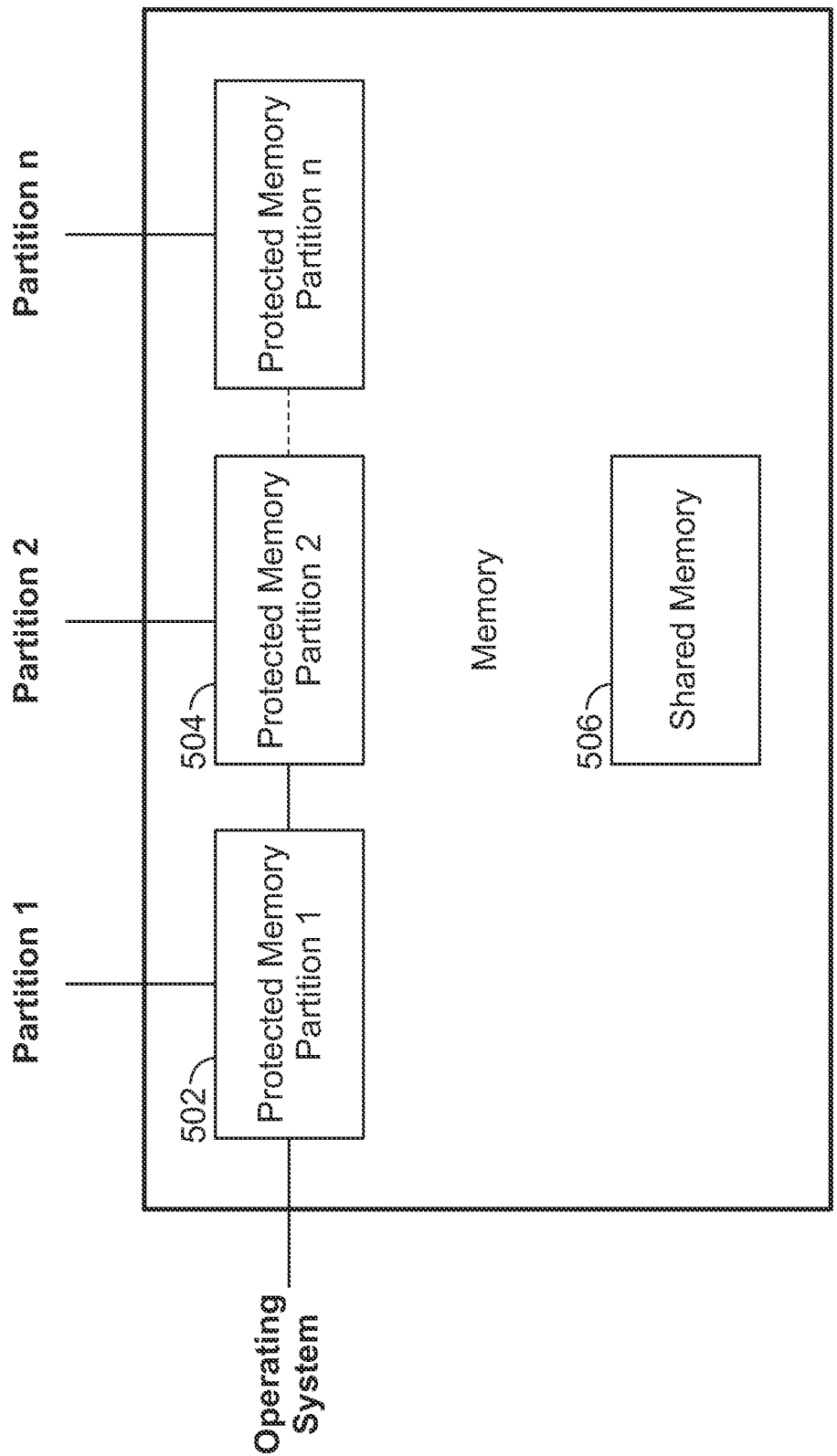
FIG. 5 illustrates an example memory architecture.

FIG. 5 illustrates an example memory scheme. In this example, a given partition 1, 2, . . . , n has an associated protected memory space 502, 504, . . . n. In this example, one partition cannot/is prevented from directly accessing the protected memory space of another partition. Therefore, if a partition application (e.g., a network application) wants access to the data of another partition that is stored in protected memory space (e.g., not shared with the requesting identity), the request is routed using one or more of the techniques described above (e.g., where certain requests may be filtered out or otherwise blocked or inhibited, based on one or more rules). The operating system (which is executed by a computing device, such as control processor 508 which is optionally coupled to a portion or all of the depicted memory and/or the radio) may service permitted requests by accessing data from the corresponding protected memory associated with the partition that "owns" the requested data, and providing the accessed data to the requesting application (e.g., by writing the data to the protected memory space of the requesting application and/or in shared memory 506 shared by two or more applications).

Figure 6:
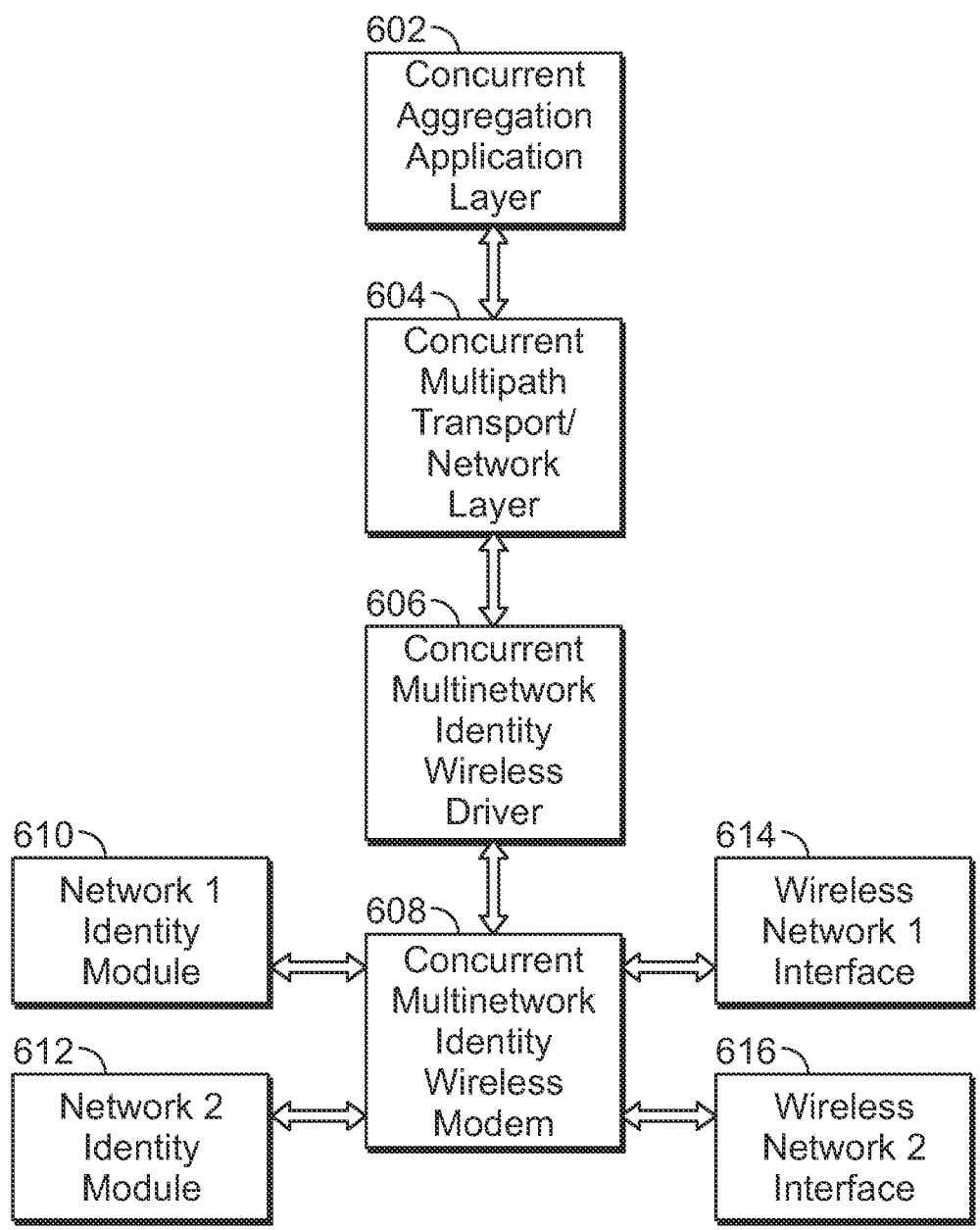
FIG. 6 illustrates an example utilization of multiple network identities in a data aggregation context.
Figure 7:
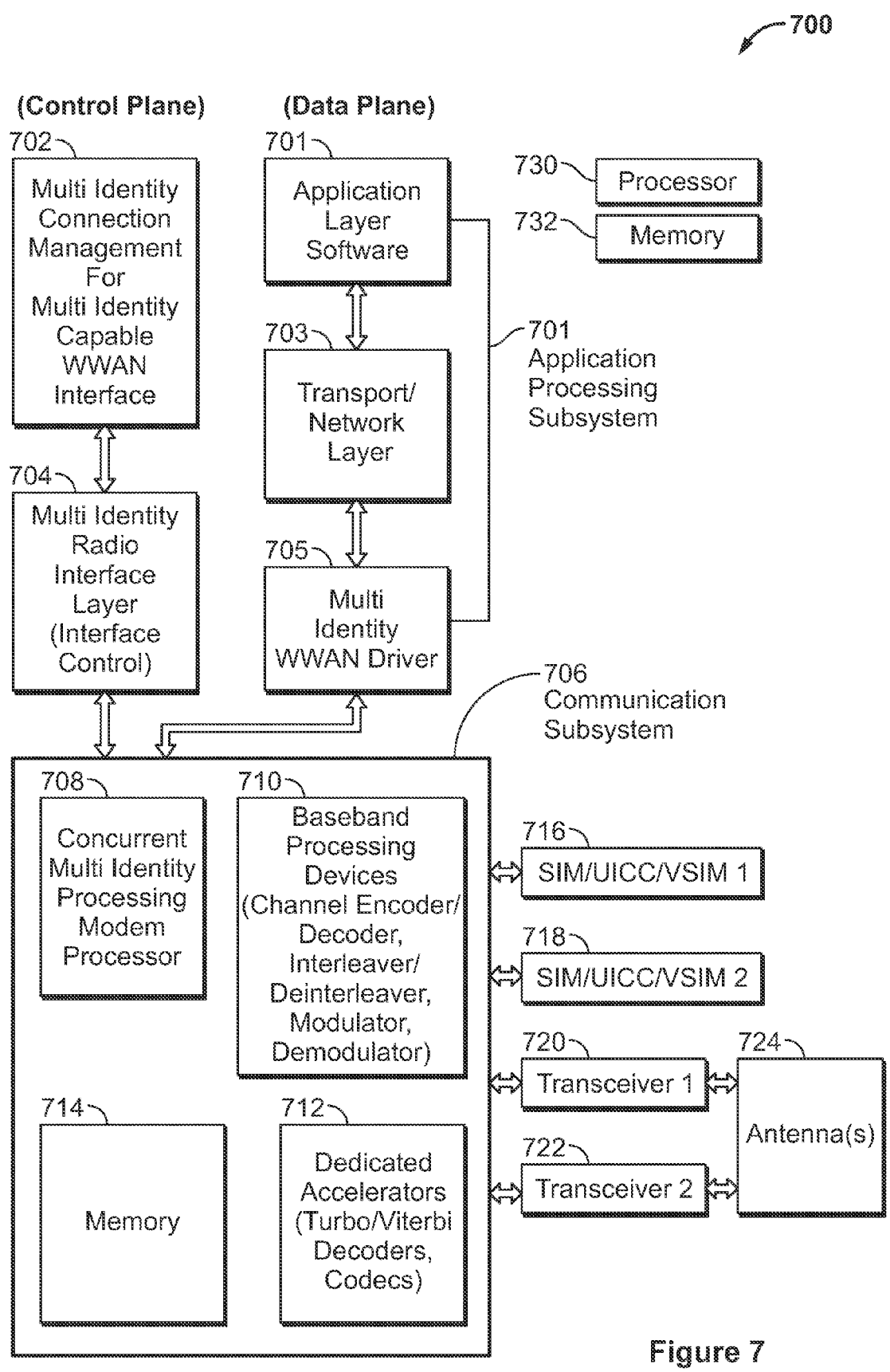
FIG. 7 is a sixth example embodiment of an architecture that provides protection for information exchanged between identities on a device.

FIG. 6 illustrates an example application of utilizing multiple network identities in a data aggregation context. Application-layer 602 utilizes multiple transport connections to different networks. Application-layer 602 interfaces with a multipath-capable transport/network layer 604, which utilizes multipath transport protocols, such as, by way of example, a MultipathTCP (Multipath Transmission Control protocol) or an SCTP (Stream Control Transmission Protocol) transport layer. The multipath-capable transport/network layer 604 interfaces with a multi-network identity capable wireless driver 606, that in-turn interacts with the multi-identity capable modem 608. Multi-identity capable wireless modem 608 is configured to concurrently access multiple networks using network interfaces 614 and 616 utilizing the multiple network identities provided by the network identity modules 610 and 612 respectively. In such a system, multiple network flows can be aggregated on the downlink paths into the application layer 602 using the transport/network layers 604 that support multiple paths. On the uplink paths, application layer 602 data may be split across uplink paths. The transport/network layers 604 are optionally configured to support tunneling capabilities into the networks. For example, the multiple paths can communicate with a common tunneling anchor in a network to aggregate bandwidth. FIG. 7 illustrates a more detailed description for a multi-WWAN system.

The example embodiment includes a processor 628 and non-transitory memory 630 (e.g., RAM, Flash memory, or other solid-state, optical, or magnetic memory type). The memory 630 may store program instructions which may be executed by the processor 628 to execute applications and perform some or all of the computing functions of the wireless communication device.

FIG. 7 illustrates another example embodiment of an architecture that provides protection for information exchanged between identities on a device, such as a wireless communication device 700. A control plane includes a multi-identity connection management for a multi-identity capable WWAN interface layer 702 that communicates with an optional multi-identity radio interface layer (MIRIL) 704 that provides an interface control. The optional multi-identity radio interface layer 704 provides an interface to the wireless communication device's baseband implementation, also referred to as modem communication subsystem 706. The MIRIL 704 provides identity separation within the modem communication subsystem 706, with time-shared utilization of baseband hardware resources (e.g., using multitasking), without requiring virtualization in the application layer, although such virtualization may be provided in the application layer.

By way of illustration, the identities may share and utilize the baseband hardware resources concurrently, via a time slice (where each identity is assigned a specified utilization time), via interleaved processing (where the system cycles through all the active resource requesters/identities that need processing/handling and provides each requester a time slice during each cycle), via a round robin arrangement (which assigns time slices to each identity in equal portions and in circular order), on a first-come, first-served basis, using multilevel queue scheduling, or otherwise. Optionally, rather then the identities sharing the baseband hardware resources, separate baseband resources can be provided within the wireless communication device 700 for each identity or for a subset of the identities.

A data plane includes an application processing subsystem that comprises an application layer software 701, a transport/network layer (e.g., layers 3 or 4 of the OSI reference model) 703, and a Multi-Identity WWAN Driver (MIWD) 705, which interfaces to the communication subsystem 706.

The modem communication subsystem 706 may include a concurrent multi-identity processing modem processor (e.g., a modem DSP processor) 708, other baseband processing devices 710 (which may include a channel encoder/decoder, interleaver/deinterleaver, modulator, demodulator, etc.), dedicated accelerators 712 (which may include turbo/viterbi decoders, codecs, etc.), and memory 714, which may include integrated memory. Thus, in certain optional embodiments, the MIRIL 704 can manage the modem communication subsystem 706 at a low level (e.g., at a DSP hardware level) so that an application layer, above the MIRIL 704, is unaware of what is happening at the DSP level.

The modem communication subsystem 706 may be coupled to one or more Subscriber Identity Modules (SIMs) 716, 718 and may manage and interact with those SIMs 716, 718. The SIMs 716, 718 may include one or more Universal Subscriber Identity Modules (USIMs). The SIMs 716, 718 may include only physical SIMs (e.g., removable USIM cards), only virtual SIMs (VSIMs) that emulate some or all of the functionality of physical SIMs (e.g., for Wireless Wide Area Networks (WWAN)), or a combination of physical SIMs and virtual SIMs. A SIM may contain its unique serial number, a user's International Mobile Subscriber Identity (IMSI), security authentication and ciphering information, temporary information related to a local network, a list of the services the user has access to and passwords for using and unlocking the wireless communication device 700. It is understood that the use of term "SIM" herein is intended to encompass a USIM, a VSIM, a Universal Integrated Circuit Card (UICC), a Removable User Identity Module (RUIR), or the like, unless the context indicates otherwise.

The wireless communication device 700 further includes one or more radio transceivers 720, 722 coupled to the modem communication subsystem 706 and one or more antennas 724. Thus, in certain embodiments each radio transceiver may have its own antenna, while in other embodiments, two or more transceivers may share an antenna. The use of multiple transceivers enables the device 700 to concurrently sustain connections on multiple respective networks.

Optionally, rather than having multiple transceivers, a single transceiver may be shared by the multiple identities and SIMs, with the transceiver tuned for the network being connected to. The transceivers and antenna enable the transmission and reception of data between the communication device 700 and a remote device (e.g., a base station or a remote mobile device).

As similarly discussed above, the wireless communication device 700 may host multiple identities (e.g., two or more client identities; a client identity and an access point identity; a client, an access point, and a coordinator; a personal identity and a business identity, a parent identity and a child identity, a first user identity and a second user identity, etc.). The management of resource requests by one identity for resources of another identity may optionally be managed by the MIRIL 704. By way of illustration, the MIRIL 704 may apply rules or filters with respect to resource requests, as similarly discussed above.

For example, the MIRIL 704 may grant or deny access to a requested resource based on one or more parameters, including one or more of: requester identity, data-type requested, location of the device 700, time request is made or received, mobility of the device 700, link condition of the device 700, load and/or battery condition of the device 700, etc. The rules or filtering may be applied in real-time or on a delayed/batch basis (e.g., at a specified periodic basis and/or at a specified time, such as once a day at 1:00 AM).

Optionally, each identity is associated with a corresponding SIM. Thus, if there are two identities, a first identity may be associated with SIM 716 and can utilize the information and the identification of SIM 716, and a second identity may be associated with 718 and can utilize the information and the identification of SIM 718. SIM 716 may be used to access a first wireless network, and SIM 718 may be used to access a second wireless network, optionally using the same modem or using different modems.

A single user may select, via a user interface, which one of the SIMs are to be used in connecting to a network, or a given SIM may be automatically selected based on the time of day, the user identity, the type of data being transmitted or received, etc., or both SIMs may be used, where the device 700 switches between the SIMs and their respective networks. Optionally, a first user of the device 700 may be associated with the first identity and may use a first SIM (e.g., SIM 716) when using the device 700, and a second user may be associated with a second identity and use the other SIM (e.g., 718) when utilizing the device 700.

Optionally, the first identity, associated with the first user (who may be a parent), may have rights to access data (e.g., received or transmitted data, photographs, text messages, etc.) of the second identity, associated with the second user (who may be a child). However, the second identity may not have rights to access the data of the first identity (e.g., that of the parent).

By way of illustration, the first identity and SIM 716 may be a business/work identity associated with a business network, and the second identity and SIM 718 may be a personal identity associated with a personal network. The MIRIL 704 may be used to isolate the business network, and the data transmitted and/or received over the business network, from the second, personal identity to thereby prevent business related data from being improperly accessed by the second personal identity and by requests received over the personal network, which may be from a malicious entity.

As similarly discussed above with respect to FIG. 5, the memory 714 may optionally include protected memory partitions, wherein a given identity has its own partition, and may optionally include shared memory shared between the identities (e.g., for exchanging information). Thus, the partitioning for the identities may be performed on the communication subsystem/modem level.

Optionally, the wireless communication device 700 includes a single operating system, although certain embodiments may include more than one operating system.

The multi-identity connection management layer 702 is aware of the multi-identity capability of the communication subsystem 706 (including the concurrent multi-identity processing modem 708), so that it can request that the connectivity to different networks using different available identities (e.g., SIMs/USIMs/VSIMs) be turned on or off. These requests can be made via the multi-identity aware radio interface layer 704 that configures the modem/communication subsystem 706 from the applications processing subsystem.

In the data plane in the applications processing subsystem, applications can open up sockets which can request TCP/IP or UDP/IP connections via the interface represented by a specific network identity that can be concurrently processed in the platform. The application data to be sent to the communication subsystem 706 for transmission, or received from the communication subsystem 706 upon reception, flows from the application layer 701, to the transport/network layer 703, and is communicated via the socket to the Multi-Identity-capable WWAN Driver (MIWD) 705, which submits an appropriate task to the communication subsystem 706 for processing.

Tasks between the application processing subsystem and the modem/communication subsystem 706 may be processed via interprocessor communication using shared memory (e.g., memory 714) available between the platform subsystems. The multi-identity aware communication subsystem 706 performs the task associated with a given network identity, and communicates (sends and/or receives) information with the appropriate transceiver for that WWAN network identity. This allows concurrent WWAN data processing across heterogeneous networks, optionally using a single multi-identity-aware WWAN modem.

Such concurrent access, enabling participation in networks using different network identities by a shared baseband implementation, can be combined with concurrent data aggregation and/or filtered processing of information across the identities. Because the example platform does not require multiple modem processing instances to communicate with different WWANs, cost and component count can be significantly reduced as compared to a platform that requires multiple modem processing instances to communicate with different WWANs. While entire modem processing instances do not need to be duplicated in a concurrent multiple-network-identity-capable-modem, optionally certain hardware accelerators may be replicated (such as a Viterbi decoder), additional memory may be included for the baseband system, and/or additional performance may be provided in the processing core(s) (such as the DSP core(s)) in the baseband processing system. While such additional processing may incur an additional cost, the overall increase in cost can be lower than merely duplicating modem instances on the platform.

The example embodiment includes a processor 730 and non-transitory memory 732 (e.g., RAM, Flash memory, or other solid-state, optical, or magnetic memory type). The memory 732 may store program instructions which may be executed by the processor 730 to execute applications and perform some or all of the computing functions of the wireless communication device.

The embodiment illustrated in FIG. 7 is similar to that of FIG. 4, however, in this embodiment a hypervisor 830 is utilized in a bare metal configuration. The hypervisor 830 runs directly on a concurrent multi-identity processing modem subsystem hardware 832 (e.g., including the modem DSP core(s), accelerators, and baseband implementation, which may include a channel encoder/decoder, interleaver/deinterleaver, modulator, demodulator, etc.), without the operating system layer between the hypervisor and the communication subsystem hardware The hypervisor 830 applies rules or filters that filter requests and/or data via a partition filter 808. The hypervisor 830 is configured to coordinate participation between different networks (optionally including different networks with the same protocol or with different protocols), such as in the scenarios discussed above. For example, the wireless communication device may have a first network role associated with a first identity (e.g., client, access point, coordinator, or relay roles), and a second network role associated with a second identity (e.g., client, access point, coordinator, or relay roles). The hypervisor 830 enables multiple identities to reside on the same hardware platform and safely share one or more objects and/or resources (e.g., a physical modem DSP, accelerators, memory, etc.).

As similarly discussed above, in certain embodiments, different protocol stacks implementing different network protocols are optionally used for different identities of the wireless device. A given identity may be provided access to information produced by that identity (e.g., location information, sensor information, user generated content, user purchased content, other content, contact information, live video or audio information, etc.). In addition, the hypervisor 830, via the filter 808 and/or rules determines which information produced by a given identity can be shared with other identities. In the illustrated example, and as explained in greater detail below, information flows through the hypervisor 830.

Figure 8:
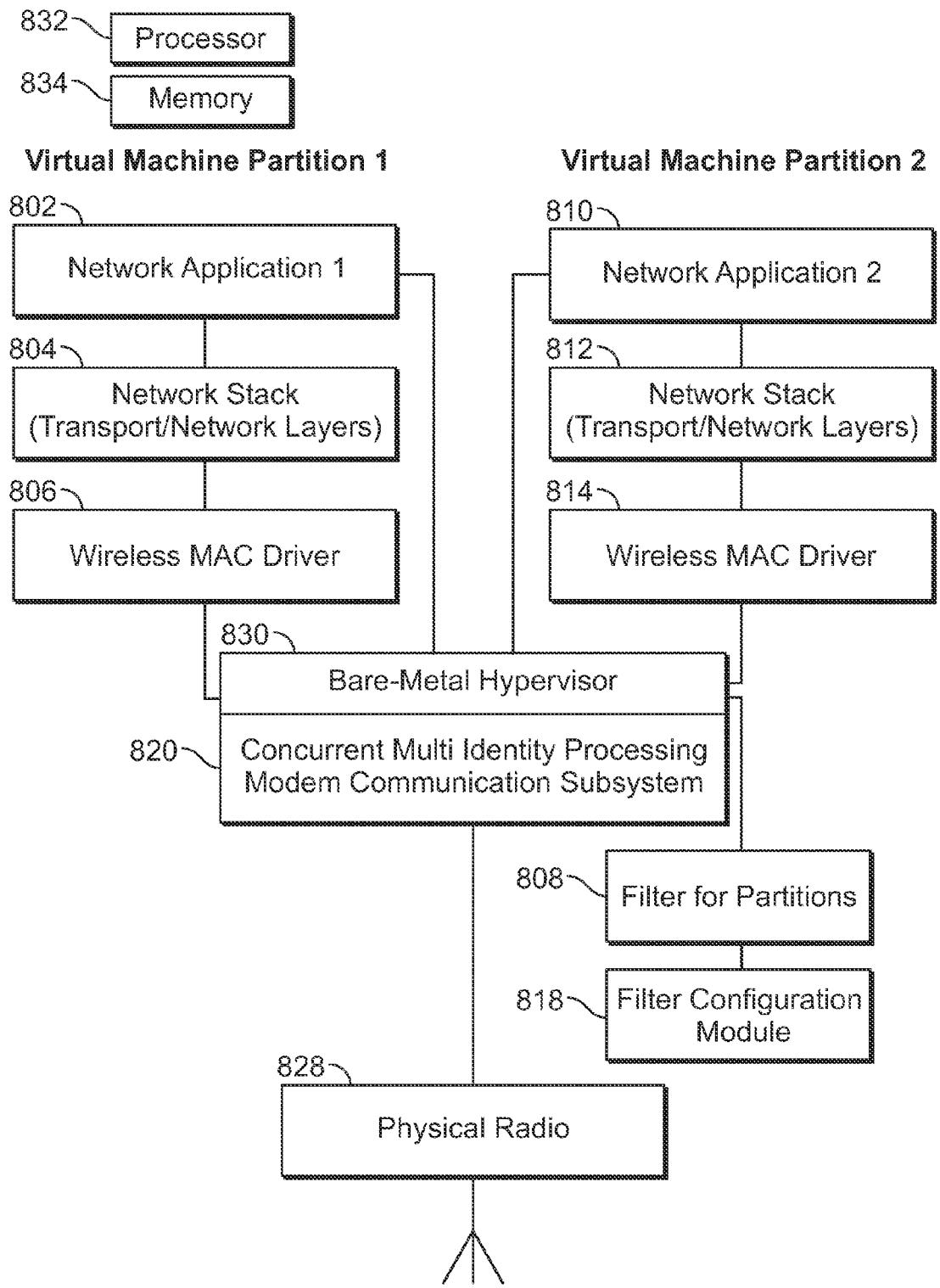
FIG. 8 is a seventh example embodiment of an architecture that provides protection for information exchanged between identities on a device.

In this example, network application requests from a given network application in one partition for data or resources of another network application of another partition are routed to the hypervisor 830. The hypervisor 830, utilizing a filter 808, filters requests and/or data. Optionally, the filter 808 can be dynamically enabled and disabled (e.g., via a signal received via the radio or via a user interface command received from a user via a device user interface). A given application may write data to a certain location (e.g., a protected memory space) not directly accessible to a requesting second application (e.g., in a different partition). The hypervisor 830 may filter and copy filtered information from the protected memory space of the subject location to another location for access to the requesting second application In the example illustrated in FIG. 8, there are two virtual machine partitions (virtual machine partition 1, virtual machine partition 2) corresponding to two different identities (e.g., an access point, relay, or coordinator for the first identity; and an access point, relay, or client for the second identity), although the device can include more than two identities. Optionally, the partitions need not be explicit.

Virtual machine partition 1 includes a network application 802, which communicates with a lower level network stack layer (e.g., a transport/network layer corresponding to layers 3 or 4 of the OSI reference model) 804, which communicates with a lower level wireless MAC driver 806, which communicates with the bare metal hypervisor 830. Virtual machine partition 2 includes a network application 810, which communicates with a lower level network stack layer (e.g., a transport/network layer corresponding to layers 3 or 4 of the OSI reference model) 812, which communicates with a lower level wireless MAC driver 814, which communicates with the bare metal hypervisor 830.

The hypervisor 830 utilizes the filter 808 to filter requests from a given network application for resources or data of a network application of a different partition. The filter 808 may perform the filtering operations in accordance with parameters/rules specified by a filter configuration module 818. For example, the filter may be configured to filter out (e.g., block or mark the requests as "not be fulfilled") requests from the application of one partition for access to an object/resource of a subject partition (e.g., to data of the other partition) that are considered unsafe or otherwise not permitted. Permitted requests are passed by the hypervisor 830 to data of the other partition in accordance with the request. As discussed above, the filter parameters or rules may include the requester identity, content/data-type, location, time requested, mobility, link condition, load, battery condition, and/or other parameters.

The parameters specified by the filter configuration monitor 818 may have been previously specified by an authorized entity, such as a device user, original equipment manufacturer, and/or network operator/telephone company. For example, a graphical user interface may be hosted/provided by the device (or accessed via another terminal, such as a personal computer) via which a user can specify what types of data are to be shared with which requesters. Optionally, the filter parameters are dynamically defined (e.g., via a wireless communication channel).

The example embodiment includes a processor 832 and non-transitory memory 834 (e.g., RAM, Flash memory, or other solid-state, optical, or magnetic memory type). The memory 834 may store program instructions which may be executed by the processor 832 to execute applications and perform some or all of the computing functions of the wireless communication device.

Figure 9:
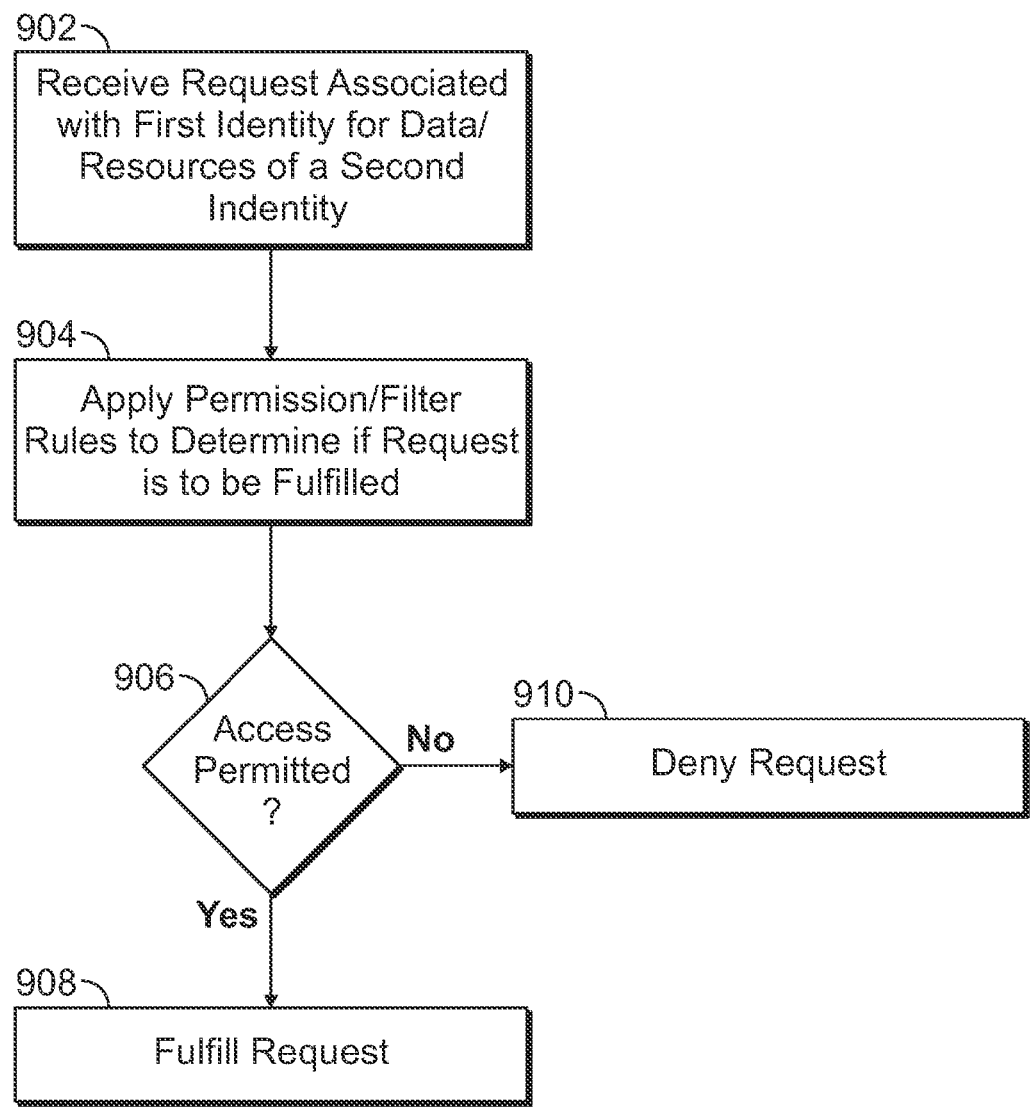
FIG. 9 illustrates an example process for managing a resource request.

FIG. 9 illustrates an example process for managing requests from an identity for data, objects, and/or processes (collectively referred to as "resources" for convenience) associated with another identity, which may be executed by a wireless communication device, such as by one or more embodiments described above. At state 902, a request is received from a requesting identity. For example, the request can be from a network application of a first identity from one or more resources of a subject identity. By way of further example and not limitation, the first identity may be associated with a first network, and the request may be received via the first network. The subject identity may be associated with a second network, and the requested resource may have been received via the second network. The request may also be received from an application hosted by the wireless communication device and associated with the first identity. The request can be received and evaluated as similarly described above (e.g., at a filter, operating system, hypervisor, multi-identity radio interface layer, etc.).

At state 904, the rules/filter are applied against the request to determine if the request is to be fulfilled. For example, the rules or filter may specify requester identity, content/data-type, location, time requested, mobility, link condition, load, battery condition, and/or other parameters, where the request and/or source of the request is analyzed in terms of those parameters to determine whether or not the request is to be fulfilled. The rules or filtering may be applied in real-time or on a delayed/batch basis (e.g., at a specified periodic basis and/or at a specified time, such as once a day at 1:00 AM).

At 906, a determination is made as to whether the requesting identity's request is to be fulfilled (e.g., if the requesting identity is to be provided access to the requested resource, which may, by way of example, include data received over the second network). If the request is to be fulfilled, the process proceeds to state 908, and the requesting identity is provided with access to the requested resource(s) of the subject identity. If the request is not to be fulfilled, the process proceeds to state 910, and the requesting identity's request is denied. Optionally, a message is sent to the requesting identity, indicating that the request has been accepted or denied.

Thus, methods and apparatus are described herein for managing a device with multiple identities, including managing the flow of information between identities, and for coordinating participation between networks Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be interchanged, and not all steps need to be reached. The steps of a method or algorithm described in connection with the embodiments disclosed herein may be embodied directly in hardware, in a software module executed by a processor, or in a combination of the two. A software module may reside in non-transitory memory, such as RAM memory, flash memory, ROM memory, EPROM memory, EEPROM memory, registers, hard disk, a removable disk, a CD-ROM, or any other form of storage medium known in the art, including semiconductor, optical, and/or magnetic storage mediums, including computer-readable storage mediums. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless apparatus comprising:
a computing device;
a baseband device, including at least:
  a modem processor;
  an accelerator;
  non-transitory memory; and
a non-transitory computer readable storage medium that stores one or more instructions, that when executed by the computing device, are configured to:
  associate a first identity of the wireless apparatus with a first wireless network, where the first identity is:
    a first access point identity, enabling the wireless apparatus to act as an access point with respect to the first wireless network;
  associate a second identity of the wireless apparatus with a second wireless network, where the second identity is:
    a client identity, enabling the wireless apparatus to act as a client with respect to the second wireless network;
  enable the first identity to communicate over the first wireless network using the baseband device;
  enable the second identity to communicate over the second wireless network using the baseband device,
  wherein the wireless apparatus is configured to partition the non-transitory memory into a plurality of partitions including a first protected memory space associated with the second identity and not shared with the first identity, and a second protected memory space associated with the first identity and not shared with the second identity, and to store at least a portion of data associated with the second identity in the first protected memory space not shared with which the first identity is prevented from accessing and, in response to a request from the first identity for a first item of data stored in the first protected memory space not shared with the first identity, determine if access to the first data by the first identity is permitted, and at least partly in response to determining that access to the first data by the first identity is permitted, copy the first data into a memory space outside of the first protected memory space, and enable the first identity to access the first data from the memory space outside of the first protected memory space, wherein the first identity and the second identity can concurrently access the first data.

2. The wireless apparatus of claim 1, wherein the first identity is a different functional identity than the second identity.

3. The wireless apparatus of claim 1, wherein the one or more instructions are configured to establish a third identity of the wireless apparatus and establish a fourth identity of the wireless apparatus, wherein the third identity is a second client identity and the fourth identity is a coordinator node identity enabling the wireless apparatus to act as a coordinator with respect to one or more networks.

4. The wireless apparatus of claim 1, wherein the one or more instructions are configured to establish a third identity of the wireless apparatus and establish a fourth identity of the wireless apparatus, wherein the third identity is a relay node identity enabling the wireless apparatus to act as a relay with respect to at least one network and the fourth identity is a second client identity.

5. The wireless apparatus of claim 1, wherein the one or more instructions are configured to establish a third identity of the wireless apparatus and establish a fourth identity of the wireless apparatus, wherein the third identity is a coordinator identity enabling the wireless apparatus to act as a coordinator with respect to at least one network and the fourth identity is a second client identity.

6. The wireless apparatus of claim 1, further comprising a hypervisor that provides separation between a protocol stack of the first identity and a protocol stack of the second identity.

7. The wireless apparatus of claim 6, wherein the hypervisor is hosted by an operating system.

8. The wireless apparatus of claim 6, wherein the hypervisor communicates directly with the baseband device.

9. The wireless apparatus of claim 1, wherein the first identity is associated with a first user and the second identity is associated with a second user, wherein the first user has rights to access resources of a first type associated with the second user, and the second user does not have rights to access the resources of the first type associated with the first user.

10. The wireless apparatus of claim 1, wherein the wireless apparatus is configured to:
  determine, using one or more parameters, whether the request from the first identity for the resource of the second identity is to be fulfilled;
  if the request is to be fulfilled, enable the first identity to access the requested resource of the second identity; and
  if the request is not to be fulfilled, deny the first identity access to the requested resource of the second identity.

11. The wireless apparatus of claim 10, further comprising a filter configured to filter, using at least a portion of the one or more parameters, requests from the first identity directed to resources of the second identity.

12. The wireless apparatus of claim 10, wherein the resource is data.

13. The wireless apparatus of claim 10, wherein the resource is sensor data.

14. The wireless apparatus of claim 10, wherein the resource is spectrum measurement data.

15. The wireless apparatus of claim 10, wherein the resource is at least one of:
   substantially live video data;
   substantially live audio data;
   radio frequency data;
   user health-related data;
   photographs;
   contact data.

16. The wireless apparatus of claim 10, wherein the one or more parameters include one or more of: requester identity, data-type requested, location of the wireless apparatus, time request is made or received, mobility of the wireless apparatus, link condition of the wireless apparatus, load, battery condition of the wireless apparatus.

17. The wireless apparatus of claim 1, wherein the apparatus is further configured to aggregate data accessed by the first identity via the first network and data accessed by the second identity via the second network.

18. The wireless apparatus of claim 1, wherein the wireless apparatus is a cellular phone.

19. The wireless apparatus of claim 1, further comprising a media access control (MAC) module configured to manage the wireless apparatus's participation in multiple networks, wherein the MAC module transmits and receives messages over a wireless communication interface.

20. The wireless apparatus of claim 1, wherein the first wireless network utilizes a different protocol than the second wireless network.

21. The wireless apparatus of claim 1, wherein the first identity is associated with a first subscriber identity module (SIM) or a first universal subscriber identity module (USIM) and the second identity is associated with a second subscriber identity module (SIM) or a second universal subscriber identity module (USIM).

22. The wireless apparatus of claim 20, wherein:
   the first SIM is a first physical SIM or USIM card or a first virtual SIM, and
   the second SIM is a second physical, SIM or USIM card or a second virtual SIM.

23. The wireless apparatus of claim 20, where the first SIM or USIM and the second SIM or USIM are supported by a single multi-identity-capable physical SIM/UICC (Universal Integrated Circuit Card)-card or a multi-identity capable VSIM.

24. The wireless apparatus of claim 1, wherein the instructions are further configured to establish a multi-identity radio interface layer configured to interface between a telephony layer and a communication subsystem including a modem.

25. The wireless apparatus of claim 1, wherein the first identity and the second identity utilize the same Viterbi decoder.

26. The wireless apparatus of claim 1, wherein the first identity and the second identity utilize a same turbo decoder.

27. The wireless apparatus of claim 1, wherein one or more tasks associated with the first identity and one or more task associated with the second identity share the baseband device modem processor concurrently, via a time slice sharing arrangement, using interleaved processing, or in a round robin arrangement.

28. The method of claim 20, wherein:
   the first SIM is a first physical SIM or USIM card or a first virtual SIM, and
   the second SIM is a second physical, SIM or USIM card or a second virtual SIM.

29. The method of claim 20, where the first SIM or USIM and the second SIM or USIM are supported by a single multi-identity-capable physical SIM/UICC (Universal Integrated Circuit Card)-card or a multi-identity capable VSIM.

30. The wireless apparatus of claim 1, wherein the one or more instructions are configured to establish a third identity of the wireless apparatus and establish a fourth identity of the wireless apparatus, wherein the third identify is:
   a first relay node identity, enabling the wireless apparatus to act as a relay with respect to at least one wireless network, or
   a first coordinator identity, enabling the wireless apparatus to act as a coordinator with respect to at least one wireless network, or
   a second client identity, enabling the wireless apparatus to act as a client with respect to at least one wireless network, or
   a second access point identity, enabling the wireless apparatus to act as an access point with respect to at least one wireless network;
   associate a second identity of the wireless apparatus with a second wireless network, wherein the fourth identify is:
   a second relay node identity, enabling the wireless apparatus to act as a relay with respect to at least one wireless network, or
   a second coordinator identity, enabling the wireless apparatus to act as a coordinator with respect to at least one wireless network, or
   a third client identity, enabling the wireless apparatus to act as a client with respect to at least one wireless network, or
   a third access point identity, enabling the wireless apparatus to act as an access point with respect to at least one wireless network.

31. A method of managing network participation using a wireless communication device, the method comprising:
   associating a first identity of the wireless communication device with a first wireless network, where the first identity is:
      a first access point identity, enabling the wireless communication device to act as an access point with respect to the wireless communication device;
   associating a second identity of the wireless communication device with a second wireless network, where the second identity is:
      a client identity, enabling the wireless communication device to act as a client with respect to the second wireless network;
   enabling the first identity to communicate over the first wireless network using a first baseband device, the first baseband device including a modem processor;
   enabling the second identity to communicate over the second wireless network using the first baseband device;
   partitioning a first memory into a plurality of partitions including a first protected memory space associated with the second identity and not shared with the first identity, and a second protected memory space associated with the first identity and not shared with the second identity;
   storing at least a portion of data associated with the second identity in the first protected memory space not shared with the first identity; and
   at least partly in response to a request from the first identity for a first item of data stored in the first protected memory space not shared with the first identity, determining if access to the first data by the first identity is permitted, and at least partly in response to determining that access to the first data by the first identity is permitted, copying the first data into a memory space outside of the first protected memory space, and enabling the first identity to access the first data from the memory space outside of the first protected memory space, wherein the first identity and the second identity can concurrently access the first data.

32. The method of claim 31, wherein the first identity is a different functional identity than the second identity.

33. The method of claim 31, the method further comprising establishing a third identity of the wireless communication device and establishing a fourth identity of the wireless communication device, wherein the third identity is a second client identity and the fourth identity is a coordinator node identity enabling the wireless communication device to act as a coordinator with respect to one or more networks.

34. The method of claim 31, the method further comprising establishing a third identity of the wireless communication device and establishing a fourth identity of the wireless communication device, wherein the third identity is a relay node identity enabling the wireless communication device to act as a relay with respect to at least one network and the fourth identity is a second client identity.

35. The method of claim 31, the method further comprising establishing a third identity of the wireless communication device and establishing a fourth identity of the wireless communication device, wherein the third identity is a coordinator identity enabling the wireless communication device to act as a coordinator with respect to at least one network and the fourth identity is a second client identity.

36. The method of claim 31, the method further comprising separating a protocol stack of the first identity and a protocol stack of the second identity using a hypervisor.

37. The method of claim 36, wherein the hypervisor is hosted by an operating system.

38. The method of claim 36, wherein the hypervisor communicates directly with the baseband device.

39. The method of claim 31, wherein the first identity is a associated with a first user and the second identity is associated with a second user, wherein the first user has rights to access resources of a first type associated with the second user, and the second user does not have rights to access the resources of the first type associated with the first user.

40. The method of claim 31, the method further comprising:
   determining, using one or more parameters, whether the request from the first identity for the resource of the second identity is to be fulfilled;
   if the request is to be fulfilled, enabling the first identity to access the requested resource of the second identity; and
   if the request is not to be fulfilled, denying the first identity access to the requested resource of the second identity.

41. The method of claim 40, the method further comprising filtering, using at least a portion of the one or more parameters, requests from the first identity directed to resources of the second identity.

42. The method of claim 40, wherein the resource is data.

43. The method of claim 40, wherein the resource is sensor data.

44. The method of claim 40, wherein the resource is spectrum measurement data.

45. The method of claim 40, wherein the resource is at least one of:
   substantially live video data;
   substantially live audio data;
   radio frequency data;
   user health-related data;
   photographs;
   contact data.

46. The method of claim 40, wherein the one or more parameters include one or more of: requester identity, data-type requested, location of the wireless communication device, time request is made or received, mobility of the wireless communication device, link condition of the wireless communication device, load, battery condition of the wireless communication device.

47. The method of claim 31, the method further comprising aggregating data accessed by the first identity via the first network and data accessed by the second identity via the second network.

48. The method of claim 31, wherein the wireless communication device is a cellular phone.

49. The method of claim 31, further comprising a media access control (MAC) module configured to manage the wireless communication device's participation in multiple networks, wherein the MAC module transmits and receives messages over a wireless communication interface.

50. The method of claim 31, wherein the first wireless network utilizes a different protocol than the second wireless network.

51. The method of claim 31, wherein the first identity is associated with a first subscriber identity module (SIM) or a first universal subscriber identity module (USIM) and the second identity is associated with a second subscriber identity module (SIM) or a second universal subscriber identity module (USIM).

52. The method of claim 31, the method further comprising establishing a multi-identity radio interface layer configured to interface between a telephony layer and a communication subsystem including a modem.

53. The method of claim 31, wherein the first identity and the second identity utilize the same Viterbi decoder.

54. The method of claim 31, wherein the first identity and the second identity utilize the same turbo decoder.

55. The method of claim 31, wherein one or more tasks associated with the first identity and one or more task associated with the second identity share the baseband device modem processor concurrently, via a time slice sharing arrangement, using interleaved processing, or in a round robin arrangement.

56. The method of claim 31, the method further comprising establishing a third identity of the wireless communication device and establishing a fourth identity of the wireless communication device, wherein the third identify is a:
   first relay node identity, enabling the wireless communication device to act as a relay with respect to at least one wireless network, or
   a first coordinator identity, enabling the wireless communication device to act as a coordinator with respect to at least one wireless network, or
   a second client identity, enabling the wireless communication device to act as a client with respect to at least one wireless network, or
   a second access point identity, enabling the wireless communication device to act as an access point with respect to at least one wireless network;
   associate a second identity of the wireless communication device with a second wireless network, wherein the fourth identify is:
   a second relay node identity, enabling the wireless communication device to act as a relay with respect to at least one wireless network, or
   a second coordinator identity, enabling the wireless communication device to act as a coordinator with respect to at least one wireless network, or a third client identity, enabling the wireless communication device to act as a client with respect to at least one wireless network, or a third access point identity, enabling the wireless communication device to act as an access point with respect to at least one wireless network.

\* \* \* \* \*